(12) United States Patent
Horton

(10) Patent No.: US 8,947,778 B2
(45) Date of Patent: Feb. 3, 2015

(54) TWO MIRROR UNOBSCURED TELESCOPES WITH TILTED FOCAL SURFACES

(76) Inventor: Richard F. Horton, Los Lunas, NM (US)

( * ) Notice: Subject to any disclaimer, the term of this patent is extended or adjusted under 35 U.S.C. 154(b) by 35 days.

(21) Appl. No.: 13/117,281

(22) Filed: May 27, 2011

(65) Prior Publication Data

US 2012/0200914 A1    Aug. 9, 2012

Related U.S. Application Data

(60) Provisional application No. 61/350,102, filed on Jun. 1, 2010.

(51) Int. Cl.
| | |
|---|---|
| *G02B 23/06* | (2006.01) |
| *G02B 17/06* | (2006.01) |
| *G02B 23/02* | (2006.01) |

(52) U.S. Cl.
CPC ............ *G02B 23/06* (2013.01); *G02B 17/0621* (2013.01); *G02B 23/02* (2013.01); *G02B 17/0615* (2013.01)
USPC ............................. 359/419; 359/366; 359/424

(58) Field of Classification Search
USPC .......... 359/364, 365, 366, 399–406, 419–425
See application file for complete search history.

(56) References Cited

U.S. PATENT DOCUMENTS

| | | | |
|---|---|---|---|
| 3,694,654 A | 9/1972 | Crownover | |
| 4,205,902 A | 6/1980 | Shafer | |
| 4,265,510 A | 5/1981 | Cook | |
| 4,433,924 A | 2/1984 | Quinn | |
| 4,598,981 A * | 7/1986 | Hallam et al. | 359/366 |
| 4,626,685 A | 12/1986 | Pitalo et al. | |
| 4,639,603 A | 1/1987 | Pistor | |
| 4,804,258 A | 2/1989 | Kebo | |
| 4,834,517 A | 5/1989 | Cook | |
| 4,876,453 A | 10/1989 | Wirick | |
| 4,927,256 A * | 5/1990 | Lacuve | 359/858 |
| 4,967,091 A | 10/1990 | Fair et al. | |
| 4,975,573 A | 12/1990 | Girard | |
| 5,142,417 A * | 8/1992 | Brunn | 359/859 |
| 5,185,526 A | 2/1993 | Reitman | |
| 5,287,218 A * | 2/1994 | Chen | 359/365 |

(Continued)

OTHER PUBLICATIONS

Moretto et al. "Off-axis systems for 4-m class telescope," Jan. 6, 1998, Optical Society of America, Applied Optics, 37, 3539-3546.*

(Continued)

*Primary Examiner* — Thomas K Pham
*Assistant Examiner* — Marin Pichler
(74) *Attorney, Agent, or Firm* — Mark Wisnosky

(57) ABSTRACT

New families of two mirror unobscured telescopes with compact Schiefspiegler, eccentric pupil Cassegrain geometries, incorporating aspheres, tilted and decentered secondaries, and tilted decentered focal surfaces. These variables allow control of focal surface tilt. All embodiments, from f/5 to f/16, are totally reflecting, fully baffled systems, with wide diffraction limited FOVs and unobscured aperture MTFs. Systems optimized with the focal plane normal to the gut ray are well suited for visual and general use. They can incorporate a variable iris for f/number control and allow focusing along the gut ray with minimal field tilt. Systems optimized with a fixed focal plane tilt are well suited for high resolution, wide field collimators and IR scene generators. Any light reflected at focus can be trapped, eliminating Narcissus or "cats eye" effects. Additionally, this reflection can be used to provide a uniform "background" irradiance field.

10 Claims, 50 Drawing Sheets

(56) References Cited

U.S. PATENT DOCUMENTS

| | | | |
|---|---|---|---|
| 5,483,362 A * | 1/1996 | Tai et al. | 359/1 |
| 5,550,672 A | 8/1996 | Cook | |
| 5,710,431 A | 1/1998 | Spindler | |
| 6,426,834 B1 * | 7/2002 | Braunecker et al. | 359/366 |
| 6,441,957 B1 * | 8/2002 | Teuchert et al. | 359/364 |
| 6,635,892 B2 | 10/2003 | Kelly et al. | |
| 6,767,103 B2 | 7/2004 | Cook | |
| 7,390,101 B2 * | 6/2008 | Lundgren | 359/858 |
| 2006/0232853 A1 * | 10/2006 | Dobschal et al. | 359/366 |
| 2009/0257118 A1 * | 10/2009 | Heritier et al. | 359/399 |

OTHER PUBLICATIONS

Moretto et al. "Corrector design with active vase mirrors that allows a fixed telescope to access a large region of the sky," Apr. 1, 1997, Optical Society of America, Applied Optics, 36, 2114-2122.*

Borodin et al. "A mirror-lens focusing objective with toroidal mirror," Oct. 2003, Optical Society of America, J. Opt. Technology, 10, 721-723.*

An Improved 4 ¼-inch Unobscured Oblique Reflector, Oscar R Knab; Sky & Telescope; Oct. 1961;232.

The World of Unobstructed Reflecting Telescopes: J. Sasian: ATM Journal #1; pp. 10-15, Fall 1992.

A New Concept for Tilted-Component Telescopes, Erwin Herrig; Sky & Telescope; Nov. 1997:113.

Box: A Breakthrough in the Design of Unobstructed Telescopes, Jose M Sasian: Sky & Telescope Nov. 1997; 114.

Off-Axis Systems for a 4-M Class Telescopes, G Moretto and J R Kuhn, Applied Optics, vol. 37, Issue 16, pp. 3539-3564, Jun. 1, 1998.

Telescope Optics, A Comprehensive Manual for Amateur Astronomers, Harrie Ruben and Martin van Venrooij; pp. 1-7, Fall 1992.

* cited by examiner

TWO MIRROR UNOBSCURED TELESCOPES WITH TILTED FOCAL SURFACES

CROSS REFERENCE TO RELATED APPLICATIONS

This application claims priority to Provisional Application Ser. No. 61/350,102, filed on Jun. 1, 2011, entitled "All Reflective 2 Mirror Unobscured Wide Field Visual Telescope and Collimator Designs", owned by the Applicant hereof and hereby expressly incorporated by reference herein.

BACKGROUND OF THE INVENTION

1. Field of the Invention
(Technical Field)

The presently claimed invention relates to optics and more particularly to two mirror unobscured telescope designs of compact "Schiefspiegler", off axis Cassegrain geometry, incorporating aspheres, tilted and decentered secondary, and tilted focal surfaces, which serve as fast, high resolution, moderately wide field telescopes/collimators. The tilted focal surfaces allow for new unique and desirable properties of the unobscured systems.

2. Background Art

Since the popularization of affordable amateur telescopes, there has been an ongoing argument between the reflector owners and the refractor owners, over which system is better. Reflecting telescopes have no color aberrations, but the central obscuration from the secondary causes loss of light as well as diffraction effects which degrade the image. The central obscuration in the pupil causes a reduction of the Strehl ratio of a point image and a decrease in mid spatial frequencies in the Optical Modulation Transfer Function (MTF). In addition, the secondary mirror support, or "spider", gives rise to the familiar "star" shaped diffraction pattern about bright stars. Refracting telescopes have no central obscurations but suffer from color aberrations, which can usually be only partially corrected using two lens elements. These color effects are not present in reflecting telescopes. Further, two element refractor apertures are smaller than reflectors for the same price, affording less light gathering power, or with more lens elements get much more expensive, heavier, and start having problems with unwanted reflections and stray light.

More complicated optical systems, such as the many variations of Schmidt-Cassegrains with refractive correctors, can, like refractors, only be optimized in a particular region of the spectrum and often suffer from compromises made in surface figure complexity to lessen the cost of the optical system.

Unobscured all reflecting telescopes designs suffer from neither MTF degradation nor color aberrations. Still, very few unobscured system designs have been produced in any quantity due to other issues. The designs in the literature are typically of small aperture, high f/number, and are often complicated in alignment and mounting.

The problem with prior art centered two mirror visual optical systems is the secondary and spider support:
  occult light—reducing system throughput;
  produce diffraction effects, which causes the focus of the system to be broader, thus lowering the MTF of the system; and
  produce opto-mechanical mounting problems due to the conflicting requirements of simultaneously mounting the secondary mirror to tolerances while minimizing the shadow cast by the secondary holder and spider.

The problems with prior art one and two mirror eccentric pupil or off axis designs for visual use are:
  they have troubling focal plane tilt;
  they are hard to baffle properly, and
  they have smaller usable fields of view than their equivalent diameter centered optical systems.

For collimator use, prior art designs are centered systems which have obscuring optics which:
  occult light and thereby underfill the optical system they are used in conjunction with;
  reflections from the target retical produce reflections which can cause narcissus effects in the system under test; and
  the reflecting area of the target retical can produce background signals of unknown and or uncontrolled amplitude.

For collimator use current eccentric pupil systems are limited in usable field of view and may have reflections from the target retical which are uncontrolled, possibly resulting in narcissus effects or providing a nominal field background which is radiometrically uncontrolled.

The problems with three and more mirror unobscured optical systems are their complexity and difficulty of alignment.

There are currently four prior art systems that attempt to provide a solution to the existing problems. These include the Schiefspiegler telescope, an unobscured, tilted field Newtonian telescope, a notionally, eccentric pupil Cassegrain telescope or Ritchey-Chré tien, (R-C), designs. The shortcomings of these devices are many. The Schiefspeigler telescope is too "slow" due to a high f/number and low throughput and too small a working field of view. The unobscured Newtonian device is also similarly "slow". The eccentric pupil Cassegrain (or R-C) tilted field of view and non-gut ray centered focus "walk" or focus remains on the geometric axis of symmetry while shifting from the gut ray. The three or more mirror systems are more costly to build and difficult to align.

Conventional wisdom in optical system design is to avoid tilts and decenters, except on an "individually compensating basis" so as to allow the entire system to be simply modeled using classical aberration theory. Modeling this system using classical aberration theory would be just so "messy" that optical designers have avoided doing it—hence we have not seen this design before. An expert, who is also an amateur astronomer, who has looked into midsized, reasonably fast, unobscured designs for amateur telescope, has proposed that this would require 3 or more mirror elements.

Quoting from the conclusion of a recent review article, "The World of Unobstructed Reflecting Telescopes" by José Sasián: "The known designs cover very well the span of small (3 to 5 inches) and medium apertures (6 to 8 inches) with great practicality and transportability. However, for larger apertures (10 inches or more), there is a need for very compact and moderately fast designs, (f/8 to f/15). These designs will probably require three mirrors and a double-curvature surface like the large Tri-Schiefspiegler discussed in section . . . . "

The prior art approaches (other than the Schiefspeigler, where it hardly matters due to the very high f/number) do not even attempt to control the tilt of the focal plane of the system. For visual use the tilted focal plane, when brought to focus in the eye, causes the image at one side to be out of focus in one direction, while at the other side, it is out of focus in the other direction. Additionally, baffling against stray light becomes a serious issue for low f/number Cassegrain systems. The incidence angle of the gut ray to the focal plane surface causes problems for the prior art system when used visually. As the f/numbers are reduced, or as power and field of view of an eyepiece increase, the focal surface of the image in the eye diverges from the retina. FIG. 1 shows the large angle, (9.5 degrees), which the focal surface makes with respect to the gut ray of a nominally 10" aperture, f/7 eccentric pupil Cassegrain which can also be baffled. If the system is compressed radially, to lessen this angle to the focal surface, the baffling will fail. Thus, for low f/number systems, the off axis Cassegrain has a necessarily large angle at the focal surface if the stray light is suppressed.

The nine 9.5 degree incidence angle of the gut ray to the focal plane surface causes problems for the system when used visually. As the f/numbers are reduced, or as power and field of view of an eyepiece increase, the focal surface of the image in the eye diverges from the retina. FIG. 2 shows an "ideal" paraxial optical model of a f/7 Off Axis Cassegrain with 9.6 degree focal surface tilt. Assuming a 1" efl eyepiece and a 9.6 degree image tilt in eye at 70×1" efl eye, (70×), the image tilt on the back of the eye is 9.6 degrees. This situation worsens with increase in power. With a ½" efl eyepiece, (140×), as shown in FIG. 3, things are a factor of 2 worse, with the image tilt on the back of the eye now 19.2 degrees.

A modest image tilt is not a particularly vexing problem for imaging systems with film or a CCD, (Charge Coupled Device), electronic imaging array at the focal lane. Linear distortion is a small problem. On the other hand, visual imaging with an eyepiece may be a serious problem, especially at system f/numbers of f/8 or less. This would also be a problem with the off axis Newtonian Telescopes at lower f/numbers although the baffling requirement becomes more severe for the Cassegrain.

Control of the tilt of the focal plane allows the system to be used for lower f/number, a wider field of view, higher resolution and better MTF. For visual and imaging optics this allows much better focusing properties and the ability to aperture the unobscured pupil with an iris. For collimating and IR scene generating optics, the tilt of the focal plane allows reflections from the target reticle to be controlled eliminating Narcissus and allowing the field over the reflective portion of the retical to be illuminated with a constant irradiance.

SUMMARY OF THE INVENTION

Disclosure of the Invention

A described above, there are no unobscured telescope designs which incorporate control of the tilt of the focal plane with the wide field of view of the best centered two mirror designs, such as Cassegrain or R-C designs. To overcome the shortcomings of the prior art and to solve the problems described above, the presently claimed invention is disclosed.

The first of the new two mirror telescope called "nCUB" designs, n for normal incidence field of view (FOV), C for conic optical surfaces, U for unobscured entrance pupil and B for baffled, provide "conventional fields of view" with no central obscuration and control of the focal plane surface, normal to the gut ray field point, providing superior visual performance to the tilted focal plane of more conventional unobscured or eccentric pupil one or two mirror systems.

Alternately, the "tCUB" family of designs, t for tilted, C for conic optical surfaces, U for unobscured entrance pupil and B for baffled, provide for control of the tilt of the focal surface for control of reflections from that surface for use in collimators, and IR scene generators. Additionally this design technique can be used for optical systems for "covert use" which do not want a "cats eye" reflection to be produced at the focal plane, and reflected back out of the system in a manner which might allow detection of the optical device. In addition by controlling the tilt of the focal plane retical, reflections of a standard brightness or color temperature background may be provided in the reflecting areas of the retical instead of having these areas of unknown or uncontrolled background amplitude.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the claimed invention. The objects and advantages of the claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, serve to explain the principles of the claimed invention. The drawings are only for the purpose of illustrating a preferred embodiment of the claimed invention and are not to be construed as limiting the claimed invention. In the drawings:

DESCRIPTION OF THE PREFERRED EMBODIMENTS

Best Modes for Carrying out the Invention

The presently claimed invention is based upon the general layout of a two mirror eccentric pupil unobscured Cassegrain optical system, consisting of a concave primary mirror and a convex secondary mirror.

Figure 1:
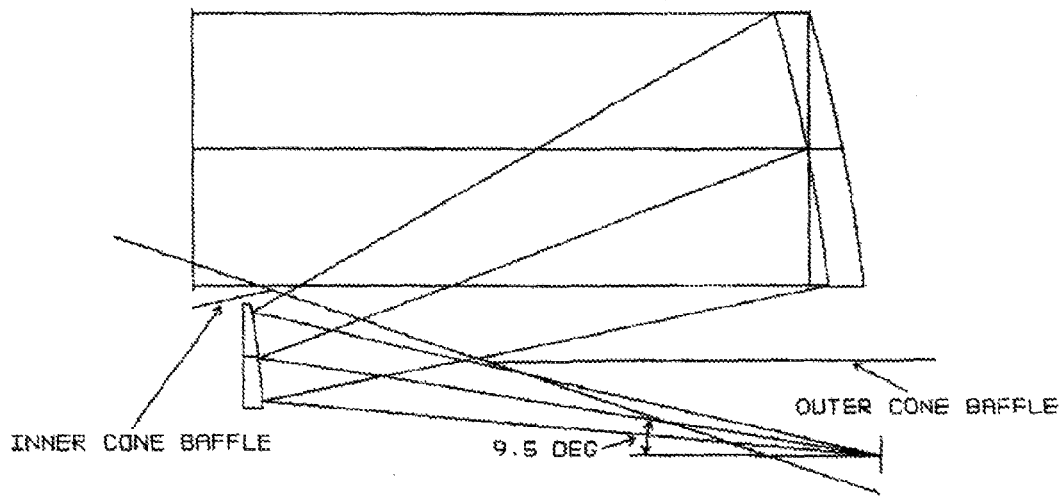
FIG. 1 is Prior Art—Drawing of baffled off axis—eccentric pupil Cassegrain—10" diameter f/7 optical system—showing focal plane tilt.
Figure 2:
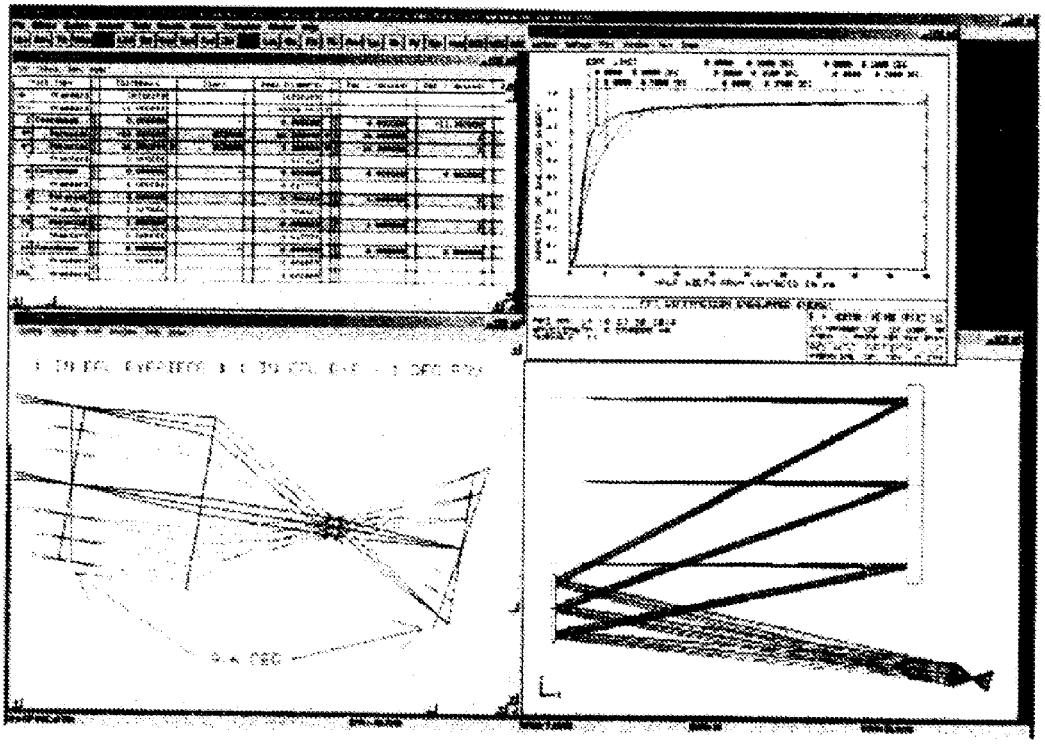
FIG. 2 is Prior Art—Screen dump of ZEMAX modeling of effect of focal plane tilt on visual use of an eyepiece at 70×
Figure 3:
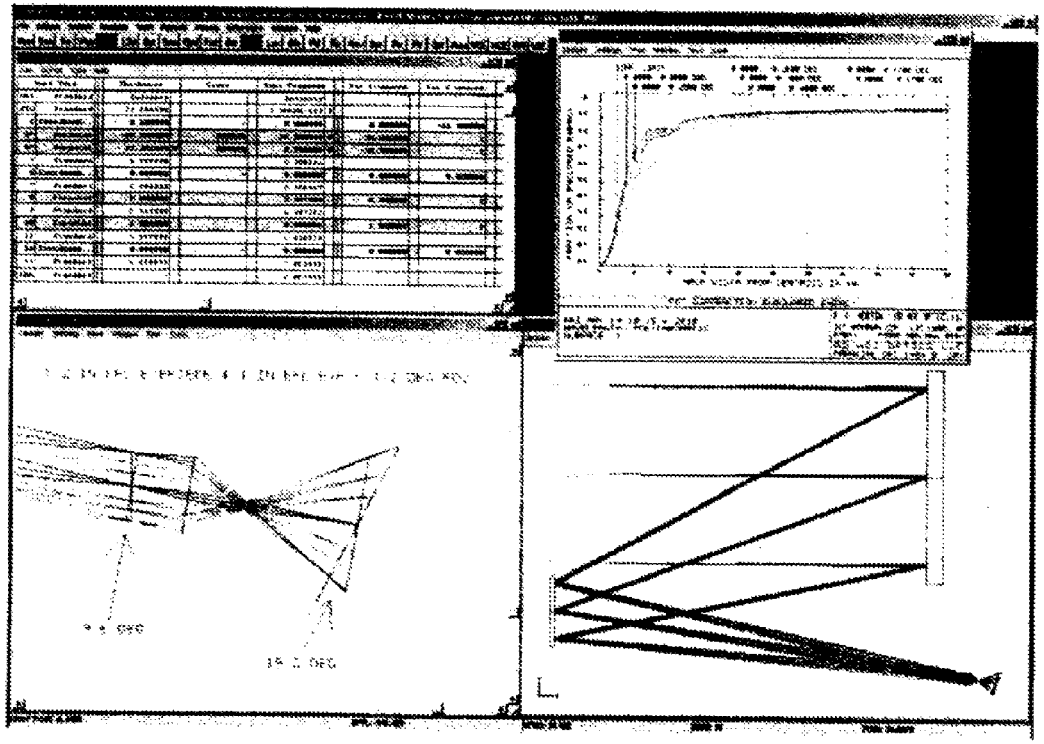
FIG. 3 is Prior Art—Screen dump of ZEMAX modeling of effect of focal plane tilt on visual use of an eyepiece at 140×
Figure 4:
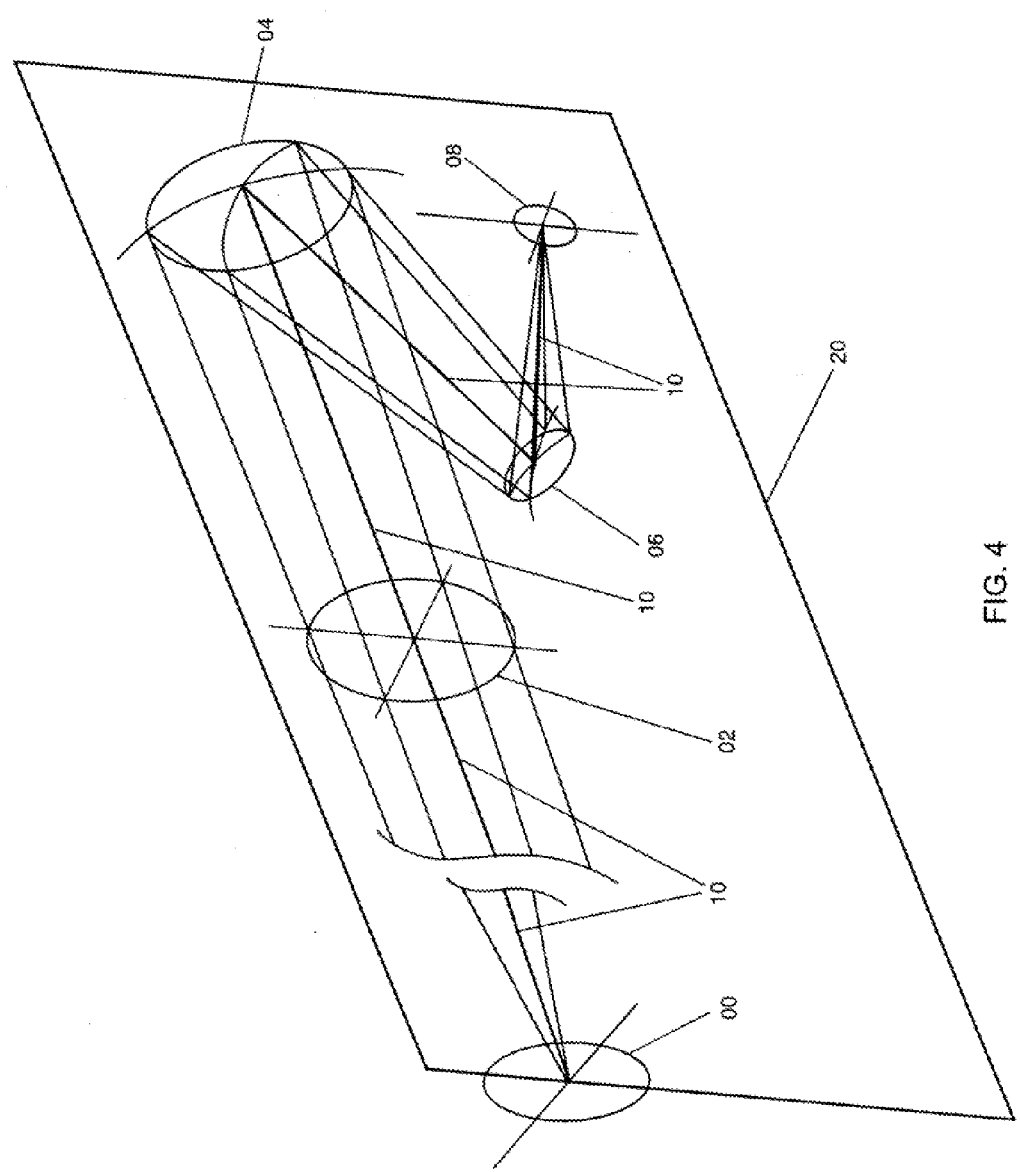
FIG. 4 is drawing for detailed description of optical system geometry

As shown in FIG. 4, ray of light 10 from the center of object surface 00, goes through center of the entrance pupil 02, of the telescope, reflects off of the center of primary mirror 04, reflects again off of the center of secondary mirror 06, and forms a portion of the image at the center focal plane surface 08. This ray which reflects at or traverses the center of all these surfaces is commonly referred to as the gut ray 10. The centers of all optical surfaces 00, 02, 04, 06, 08 lie in a plane 20, which is the plane of mirror symmetry for the system. All three ray vector paths of gut ray 10 lie completely in the plane of mirror symmetry for system 20, as well.

Figure 5:
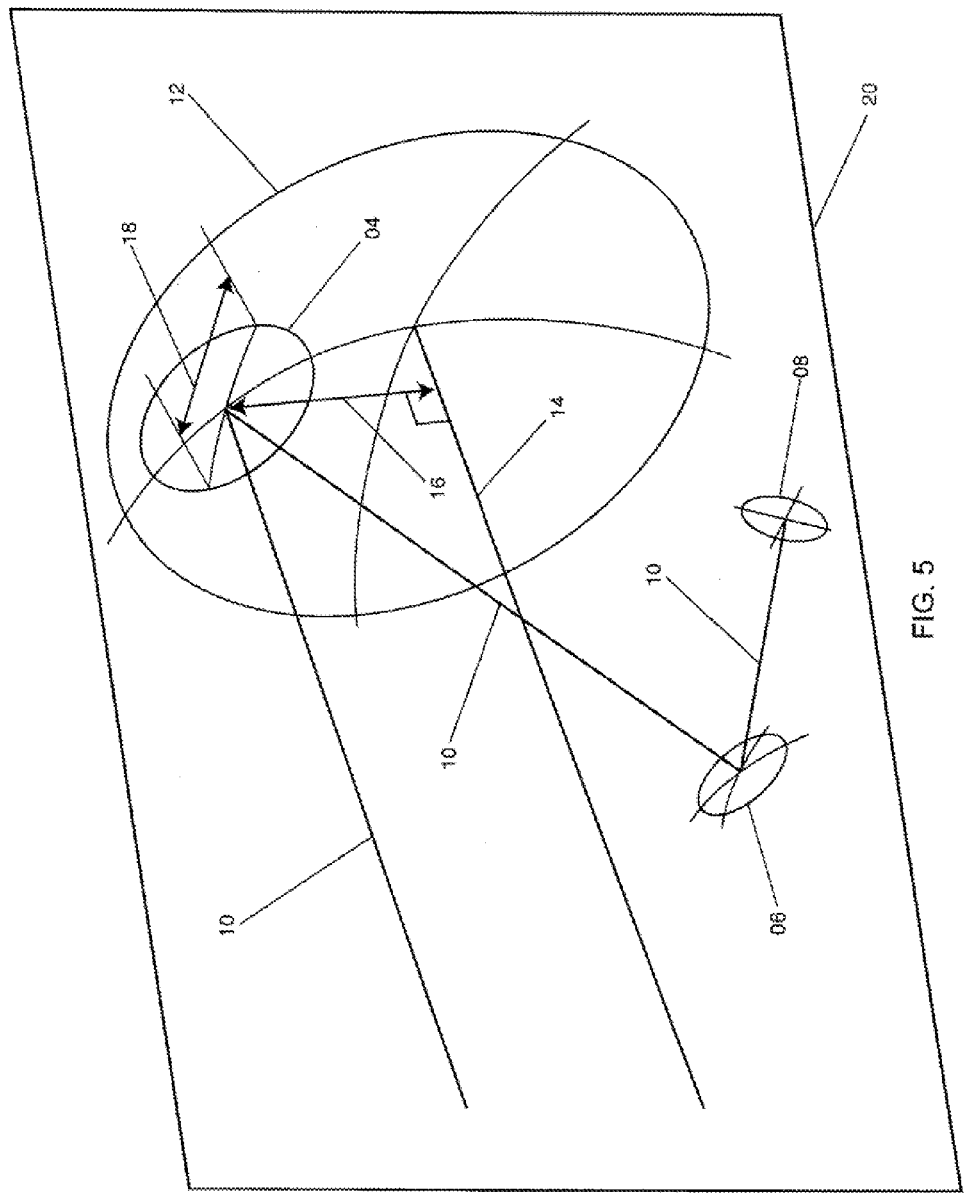
FIG. 5 is drawing for detailed description of primary mirror geometry

As shown in FIG. 5, primary mirror 04, is an off axis section of a rotationally symmetric aspheric concave mirror 12, referred to as a parent mirror. The section or primary mirror 04 which is used does not contain the axis of symmetry 14 of the primary mirror's rotationally surface figure. The axis of symmetry of parent mirror is parallel to gut ray 10, incident on primary mirror 04 and both vectors lie in plane of mirror symmetry 20. The primary center offset, Op 16, is the perpendicular distance from the center of convex primary mirror 04 to the axis of symmetry of the parent mirror surface 12. If parent mirror surface 12 is a conic, it may be defined mathematically about axis of symmetry 14 by the vertex radius Rp and conic constant Kp, then the surface of primary mirror 04 that is being used is fully defined by offset Op 16, diameter of the mirror Dp 18 and the parent surface vertex radius Rp and conic constant Kp.

A standard formula for a conic optical mirror surface ("sag"), Z(r) about its axis of symmetry in terms of c=1/Rs (the vertex radius), and k=conic constant Ks is:

$$Z(r)=(c*r^2)/(1+\mathrm{sqr}(1-((1+k)*c^2*r^2)))$$

Figure 6:
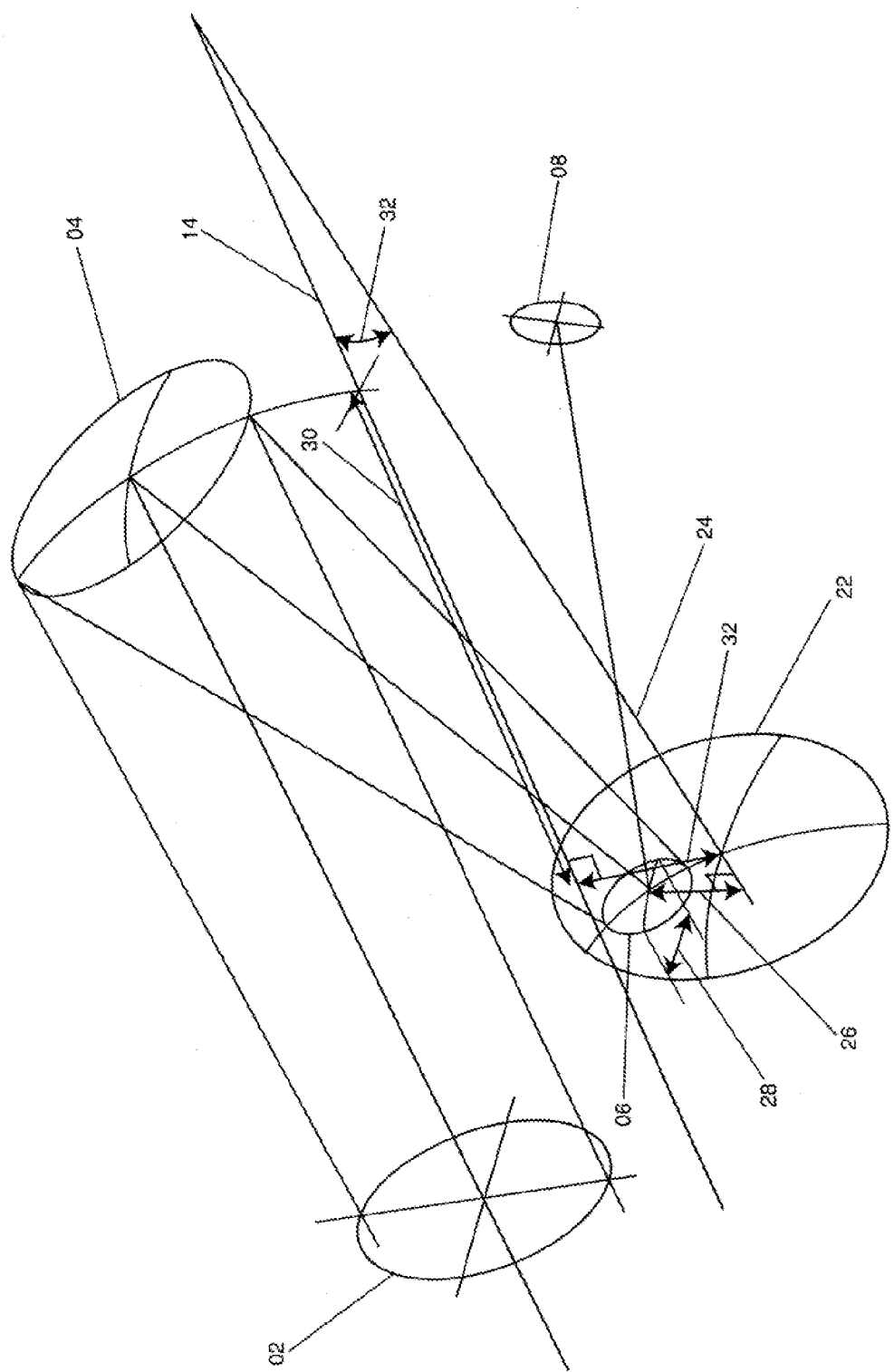
FIG. 6 is drawing for detailed description of secondary mirror geometry

More complex parent mirror surfaces may be polynomial surfaces of rotation about the vertex axis or even torroidal surfaces, which are once again defined about the vertex axis, but may have only mirror symmetry about the plane of symmetry for optical system 20. For simplicity, this disclosure will be described in the conic form, but the geometry of the primary and secondary surfaces can be generalized into both rotationally symmetric polynomial surfaces and further to torroidal surfaces symmetric about the plane of mirror symmetry for system 20, and this disclosure is intended to include these other embodiments As shown in FIG. 6, secondary mirror 06, is an off axis section of a rotationally symmetric aspheric convex parent mirror 22, and is similar to the situation of the primary mirror 04 described previously. Section of secondary mirror 06 which is used does not contain the axis of symmetry 24 of the secondary mirror's rotationally symmetric surface. The perpendicular offset distance of the center of the mirror from the axis of symmetry is defined as Os 26 and the diameter of the secondary mirror is defined as Ds 28. As with the primary mirror, if parent mirror surface 22 is defined by the vertex radius Rs and conic constant Ks, then the surface of the secondary mirror 06 is fully defined by offset Os 26, diameter Ds 28, radius Rs and conic constant Ks of parent mirror surface 22.

Still referring to FIG. 6, the vertex of the convex secondary parent mirror 22 is displaced from the primary mirror vertex axis 14, distances parallel 30 and perpendicular 32 to the primary vertex 14. Both vectors 30 and 32 lie in mirror symmetry plane of system 20. The axis of symmetry of secondary mirror 24 is tilted with respect to the axis of symmetry of primary mirror 14, such that the two axes are in the same plane, but tilted by an angle Theta S 32.

Figure 7:
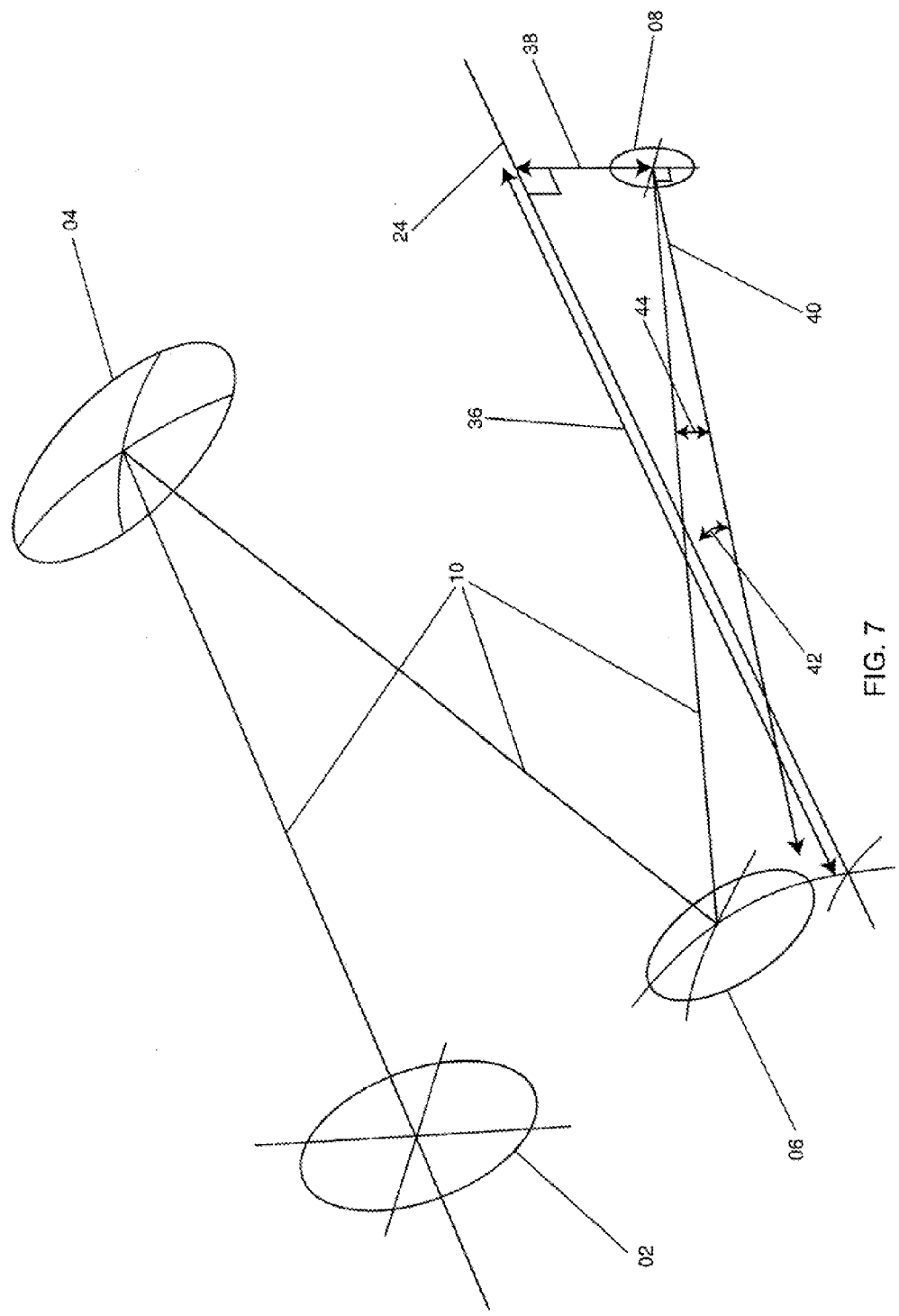
FIG. 7 is drawing for detailed description of focal plane geometry

As shown in FIG. 7, focal plane 08, is a circular plane surface centered on the gut ray 10. The axis of focal plane 08 is situated with respect to the vertex axis of secondary mirror 24 by a distance along the vertex axis 36 and a distance perpendicular to it 38. Again, both vectors 36 and 38, lie in the mirror symmetry plane of the system 20. As with the previous embodiments of the surfaces, the axis normal the center of focal plane 40 is tilted with respect to the axis of symmetry of secondary 24, such that the two axes are in the same plane, but tilted by an angle Theta F 42. The angle between focal surface normal 40 and gut ray 10 at incidence of focal surface 08 strikes an angle Gamma F 44. Note that Gamma F may be zero, i.e., the gut ray 10 may be perpendicular to the focal surface 08.

Figure 8:
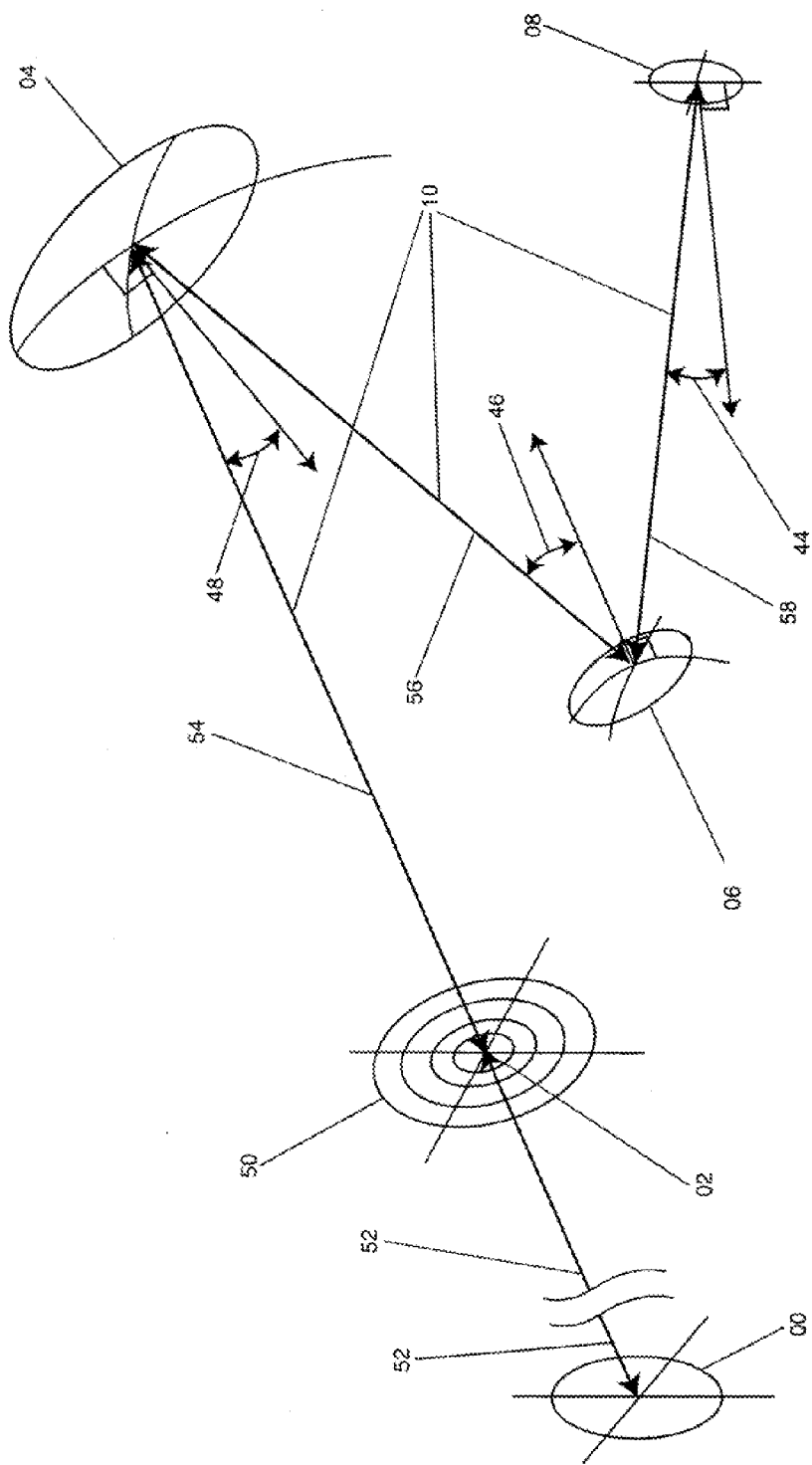
FIG. 8 is drawing for detailed description of iris and gut ray geometry

As shown in FIG. 8, the surface spacings along the gut ray are defined as: 1/ the distance from object surface 00 to entrance pupil center 02, So-e 52, 2/ the distance from the center of entry pupil center 02 to the center of the primary 04, Se-p 54 and, 3/ the distance from the center of the primary mirror 04 to the center of secondary mirror 06, Sp-s 56 and 4/the distance from the center of secondary mirror 06 to the center of focal plane 08, Ss-f 58. An iris 50, preferably of an adjustable and variable diameter, may be positioned at entrance pupil 02 and centered about gut ray 10, to vary the f/number of the system. The angle between incident gut ray 10 and the surface normal at the center of primary mirror 04 is Gamma P 48 and the angle between incident gut ray 10 and the surface normal at the center of secondary mirror 06 is Gamma S 46.

Figure 9:
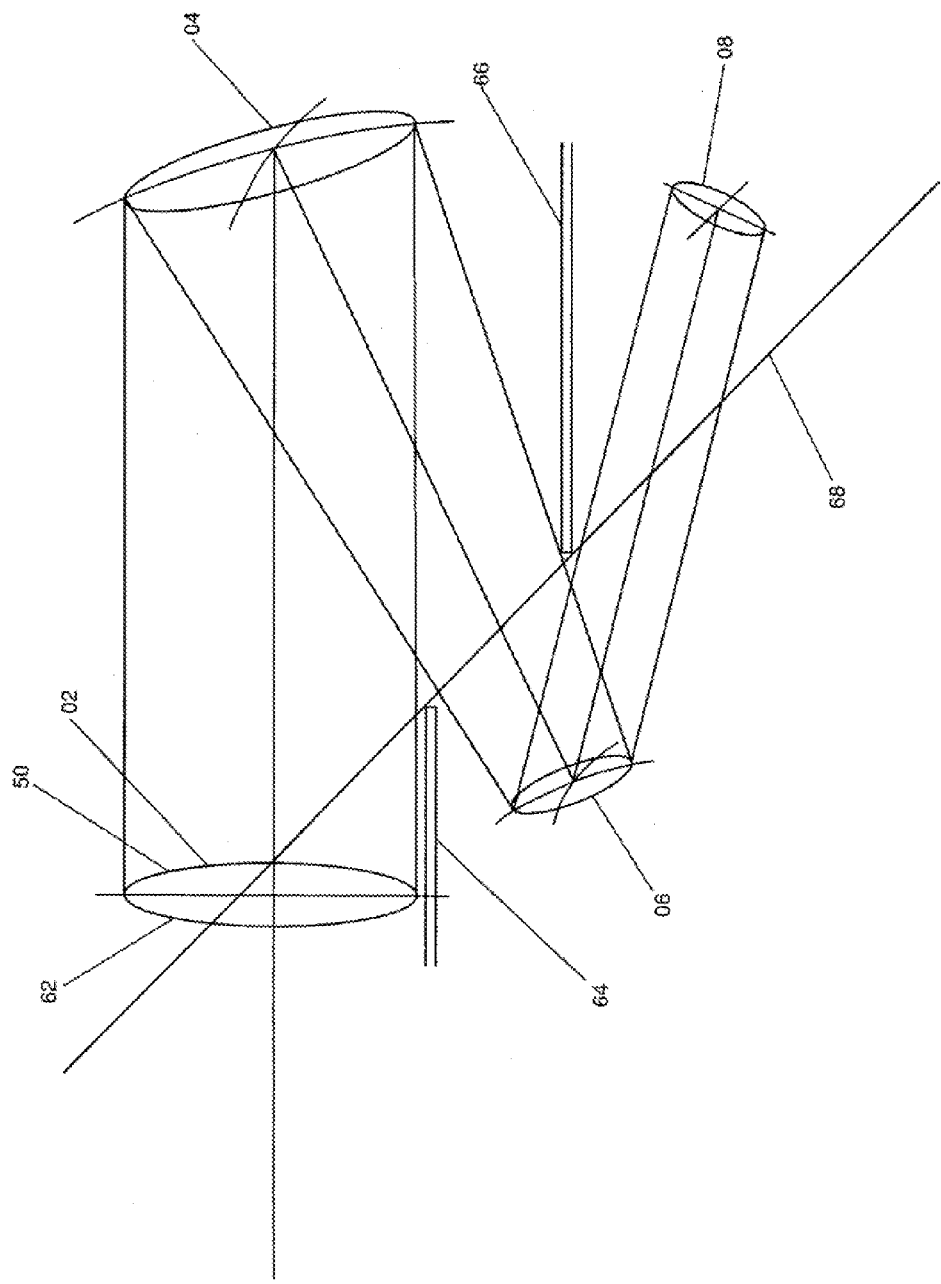
FIG. 9 is drawing for detailed description of system baffling geometry

As shown in FIG. 9, baffling is accomplished by circular stop 62, or iris 50, at entrance pupil 02, and a pair of flat obscuring baffles 64 and 66, perpendicular to the plane of the symmetry of mirror system 20. First baffle 64, arranged just outside the overlap of the bundle of light flowing between entrance pupil 02 and primary mirror 04 and the bundle of light between the primary mirror 04 and secondary mirror 06. Second baffle 66, is arranged just outside the overlap of the bundle of light flowing between the between the primary mirror 04 and secondary mirror 06 and the bundle of light flowing between secondary mirror 06 and focal surface 08. In a well baffled system, an arbitrary ray 68 entering through the circular stop 62, or iris 50, which can just get passed two baffles 64 and 66 will not impinge on focal surface 08.

Figure 10:
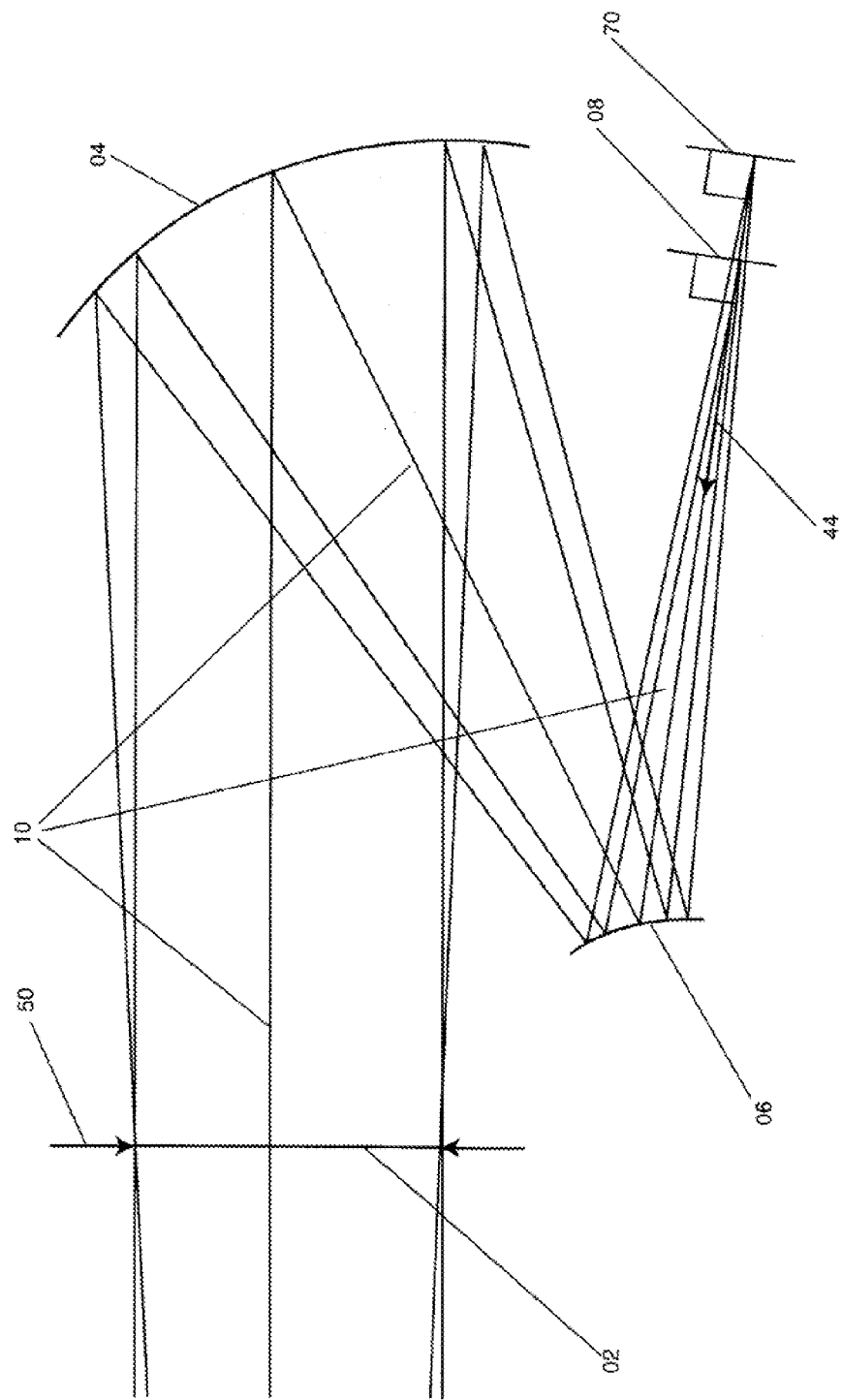
FIG. 10 is drawing for detailed description of nCUB focusing geometry
Figure 11:
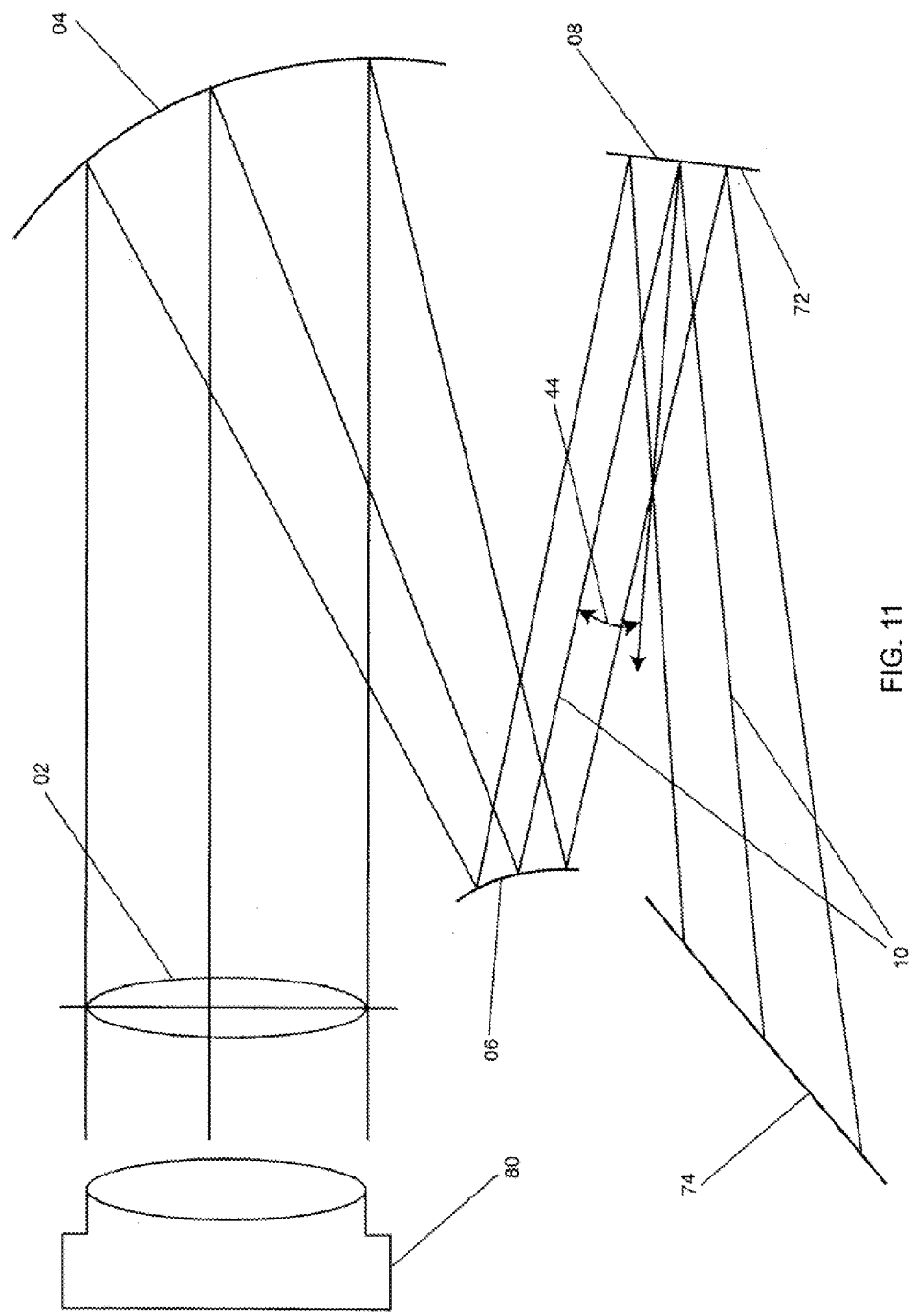
FIG. 11 drawing for detailed description of tCUB stray light suppression

FIGS. 10 and 11 show the difference in angle of the normal to the focal plane, relative to the gut ray incident at focus, Gamma F 44 between the nCUB, (Gamma F is zero), and related visual and photographic systems and the tCUB, (Gamma F is non zero), and related collimator and scene generator systems.

As shown in FIG. 10, for the visible and photographic, nCUB, systems, the tilt of focal plane 08 to gut ray 10 is configured so the angle, Gamma F 44 is equal to zero. With the focal surface perpendicular to the incident gut ray, focusing along gut ray 10 is simple, as an arbitrary focal plane surface 70 corresponding to a nearer object distance 52, than the normal "infinite conjugate" focal plane 08 remains perpendicular and centered to extended gut ray 10 without lateral image walk. In addition, the action of an iris 50 is symmetric about gut ray 10 at an arbitrary focus position 70.

As shown in FIG. 11 for the tCUB IR collimator, for scene generators and the like, the tilt of focal plane 44, Gamma F is non zero and a predetermined fixed angle. The optical system geometry not only allows reticle 72 to be imaged "perfectly" to the collimator output, but also allows light from a system being tested 80, reflecting from a reticle 72 at the focal surface to be diverted to a baffle 74 and eliminated. This can be used to prevent narcissus and "cats eye" reflections from going back out the entrance pupil of the optical system. In the case of an IR scene generator, baffle 74 can be a uniform emitting surface maintained at a low temperature to provide a uniform background irradiance in between the higher emittance apertures in the reticle.

The basic elements for the disclosed embodiments are: two mirrors and the geometry of their surfaces and the placement of the mirrors with respect to each other, the positions of the object planes and entrance pupil, and the tilt and position of the focal plane; baffles to control stray light; focus of the normal focal plane along the gut ray of the system as in the nCUB; or tilt of a reticle at the focal plane and the baffling of the stray light reflected from it, the use of a low temperature emitting the surface to create a uniform background in the reflected area of the reticle as in the tCUB; and optionally an iris to control the f/number or speed of the system.

INDUSTRIAL APPLICABILITY

The claimed invention is further illustrated by the following non-limiting examples.

Figure 12:
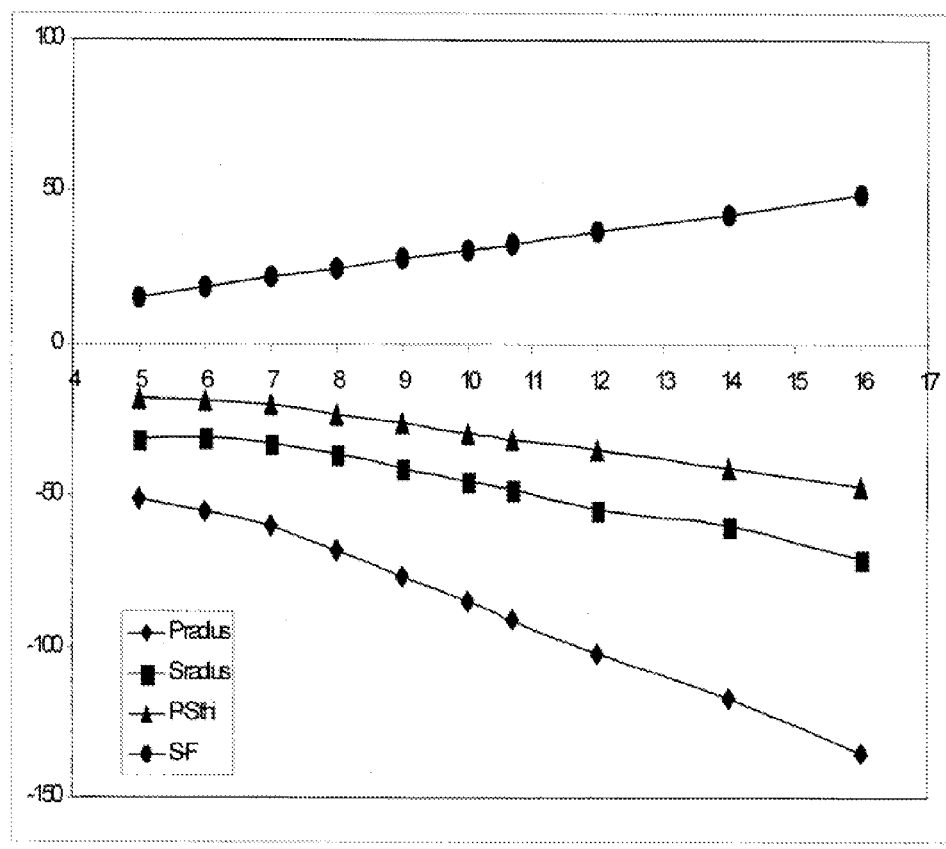
FIG. 12 is table of mirror radii and thickness for nCUB systems f/5-f/16
Figure 13:
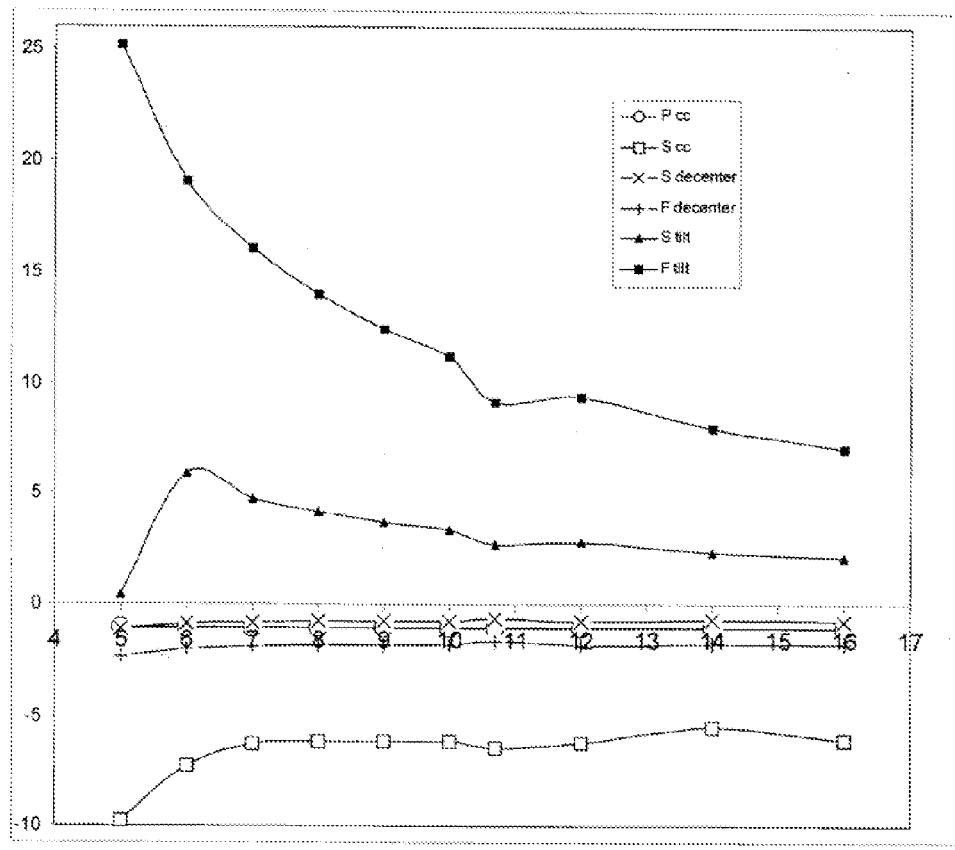
FIG. 13 is table of conic constants, decenters and tilts for nCUB f/5-f/16
Figure 14:
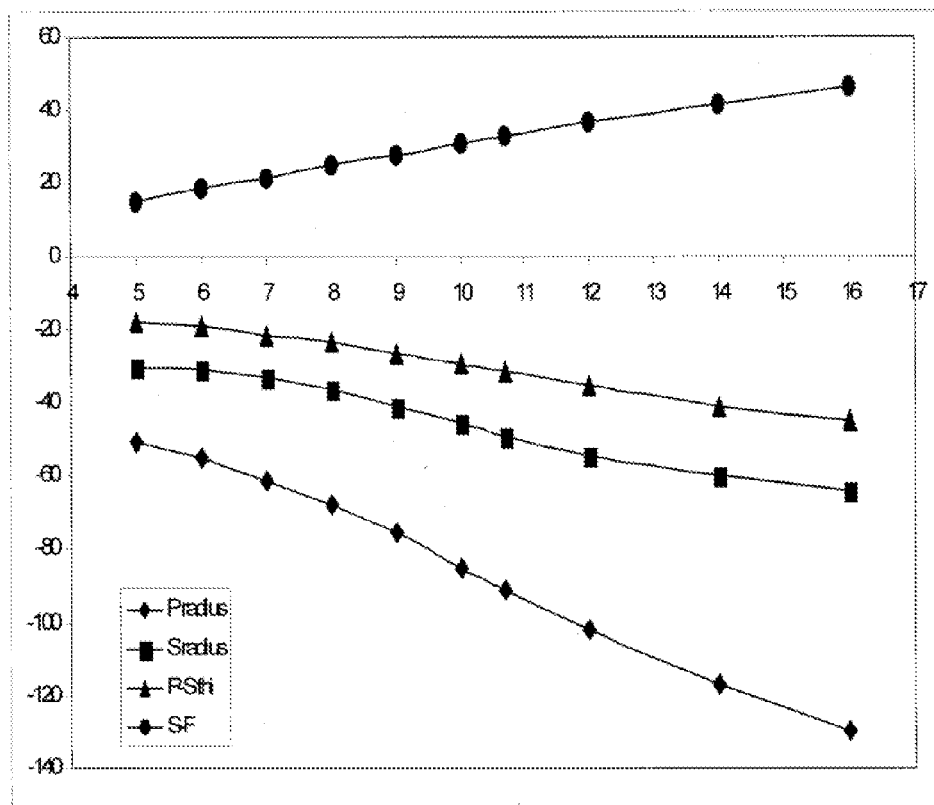
FIG. 14 is table of mirror radii and thickness for tCUB systems f/5-f/16

FIGS. 12 through 14 show the variation of several relevant geometric factors for the nCUB family of telescopes from f/5 to f/16. Again, all are scaled to an aperture of 10 inches. All optical analysis for the nCUB optical systems are shown for a single visible wavelength of 0.55 um, all tCUB for an infrared wavelength of 1.0 um. Since there are no color effects, other than diffraction, all aberrations are purely geometric and because of this, the performance of any sized system at any wavelength can be found by the appropriate scaling.

Note that in ZEMAX the decenter and tilt the secondary is measured with respect to the vertex axis of the decentered primary mirror, and the tilt and decenter of the focal plane may be measured relative to the vertex axis of the decentered secondary mirror.

EXAMPLE I nCUB Visual Telescopes

For systems which have been optimized for a focal surfaces orthogonal to the axis of the gut ray, disclosed is a family of nCUB optical systems from f/5 to f/16. These systems are described by the optical prescription parameters from ZEMAX, which are shown in FIGS. 12 and 13. FIG. 12 shows spreadsheet compilations and plots of mirror radii and spacings. FIG. 13 shows spreadsheet compilations and plots of conic constants, decenters and tilts.

FIGS. 16 through 25 are printouts of ZEMAX screen dumps for nCUB optical systems from f/5 through f/16. The printouts give a complete description of the optical device in terms of surfaces, surface vertex radius, thicknesses between surfaces, conic constants of the surfaces, tilts and decenters. There is a line drawing of the optical system as well as a field performance "map" and wavefront error plot versus field plot, field curvature/distortion plot, and "FFT Diffraction Ensquared Energy Half Width plot, which gives theoretical spot sizes for different field points. ZEMAX is a professional Optical design software which is a product of ZEMAX Development Corporation, 3001 112$^{th}$ Ave NE, Suite 202, Bellevue, Wash. 98004-8017.

A list of the parameters used in the detailed description of the device and their nominally corresponding ZEMAX parameter values follow:

| Detailed Device Parameter | Corresponding ZEMAX Parameter |
|---|---|
| Object Surface 00 | Surface # OBJ |
| Entrance Pupil Surface 02 | Surface # 1 |
| Primary Mirror 04 | Surface # 4 |
| Secondary Mirror 06 | Surface # 6 |
| Focal Plane 08 | Surface # 10 |
| Spacings o-e 52 | Surface OBJ thickness |
| Spacing e-p 54 | Surface 1 thickness |
| Vertex spacing p-s 30 | Surface 4 thickness |
| Vertex spacing s-f 36 | Surface 8 thickness |
| Primary: Rp | Surface 4 radius |
| Secondary Rs | Surface 8 radius |
| Primary Kp | Surface 4 conic |
| Secondary Ks | Surface 8 conic |
| Primary Offset Op 16 | Surface 3 decenter |
| Secondary Offset Os 26 | Surface 5 decenter |
| Focus Offset Of 38 | Surface 9 decenter |
| Tilt Theta S 32 | Surface 5 tilt about x |
| Tilt Theta F 42 | Surface 9 tilt about x |

FIGS. 26-29 show the reasonable focusing properties of an example 10" diameter f/7 nCUB telescope using the same style ZEMAX screen dumps, used to describe the nCUB systems prior. Note that the focal plane 70 remains perpendicular to the gut ray 10 over a range of focus down to 417' with the center of the object field staying in the center of the focal plane 08 with reasonable field performance. The focusing performance of other f/number nCUB systems is expected to be similarly well behaved.

EXAMPLE II tCUB Collimator Telescopes

Figure 15:
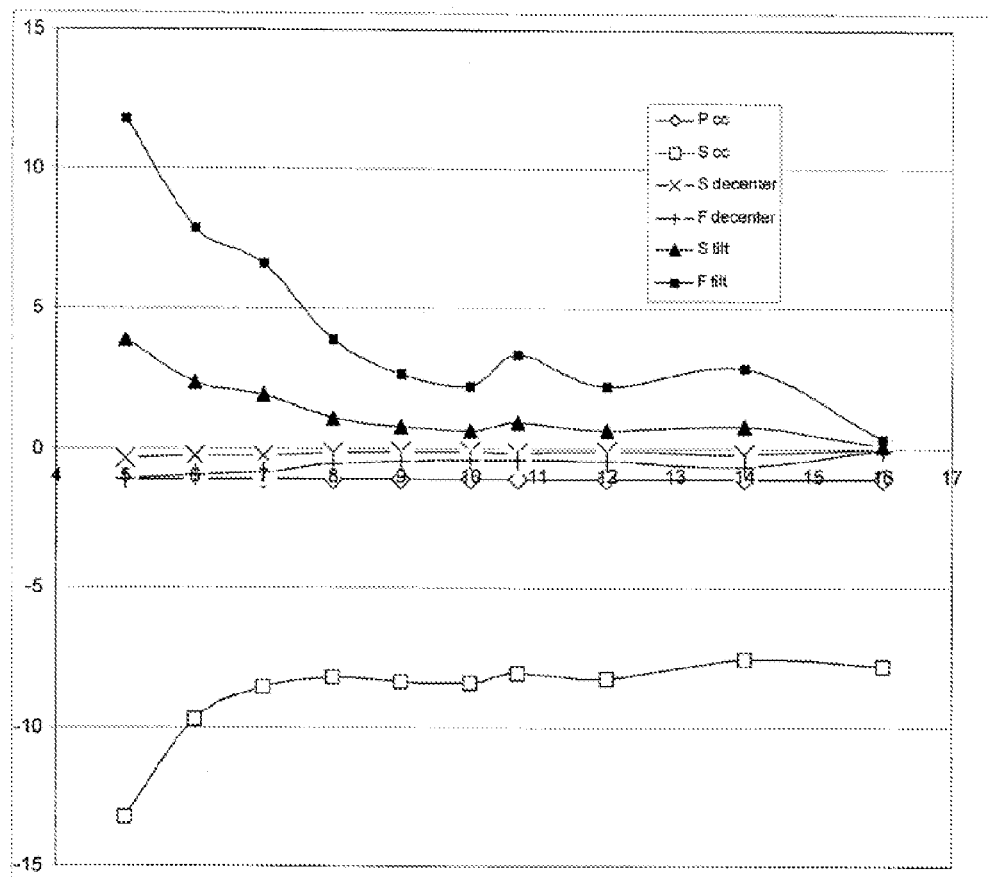
FIG. 15 is table of conic constants, decenters and tilts for tCUB f/5-f/16
Figure 16:
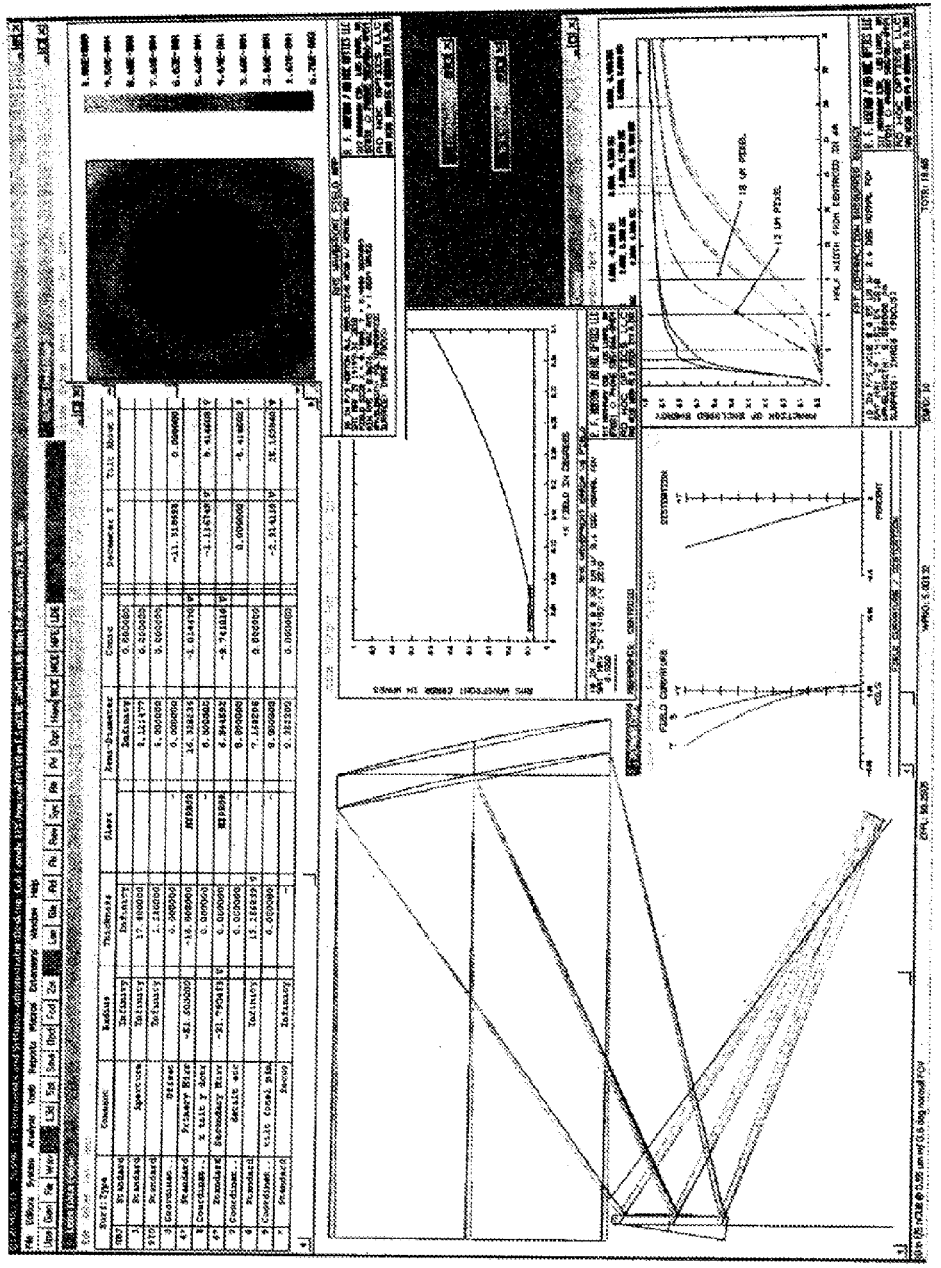
FIG. 16 is ZEMAX screen dump—f/5 nCUB optics and properties
Figure 17:
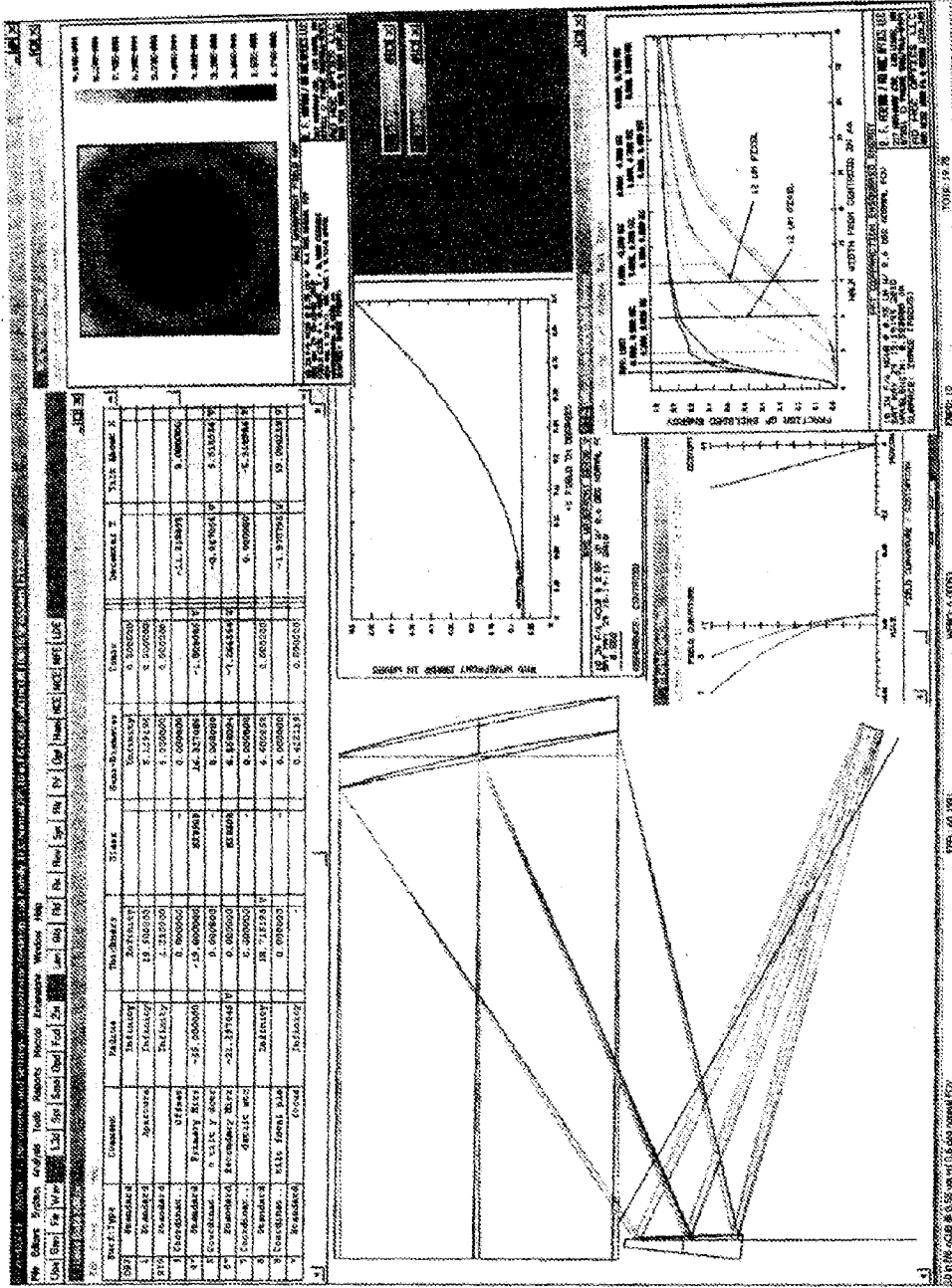
FIG. 17 is ZEMAX screen dump—f/6 nCUB optics and properties
Figure 18:
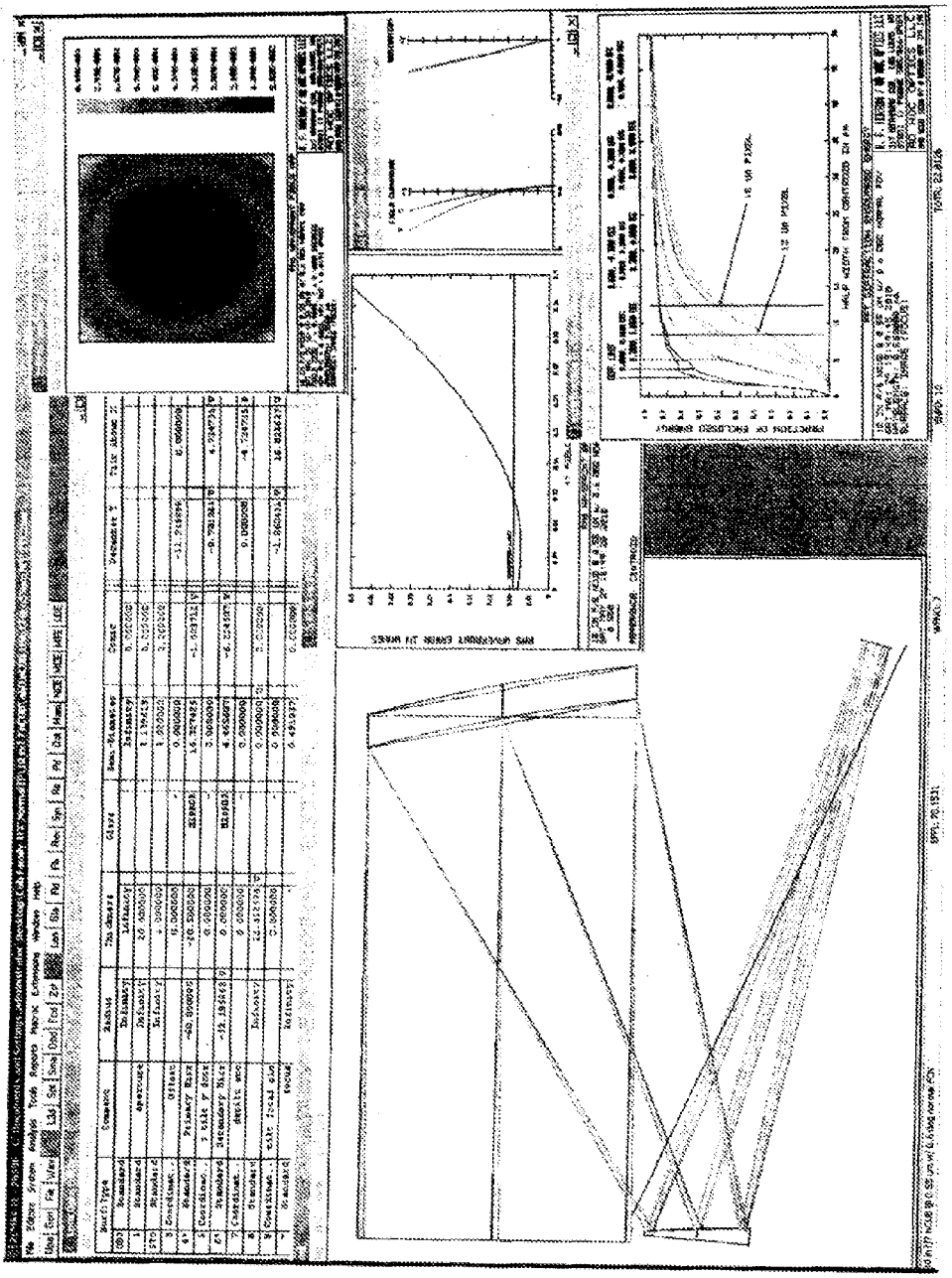
FIG. 18 is ZEMAX screen dump—f/7 nCUB optics and properties
Figure 19:
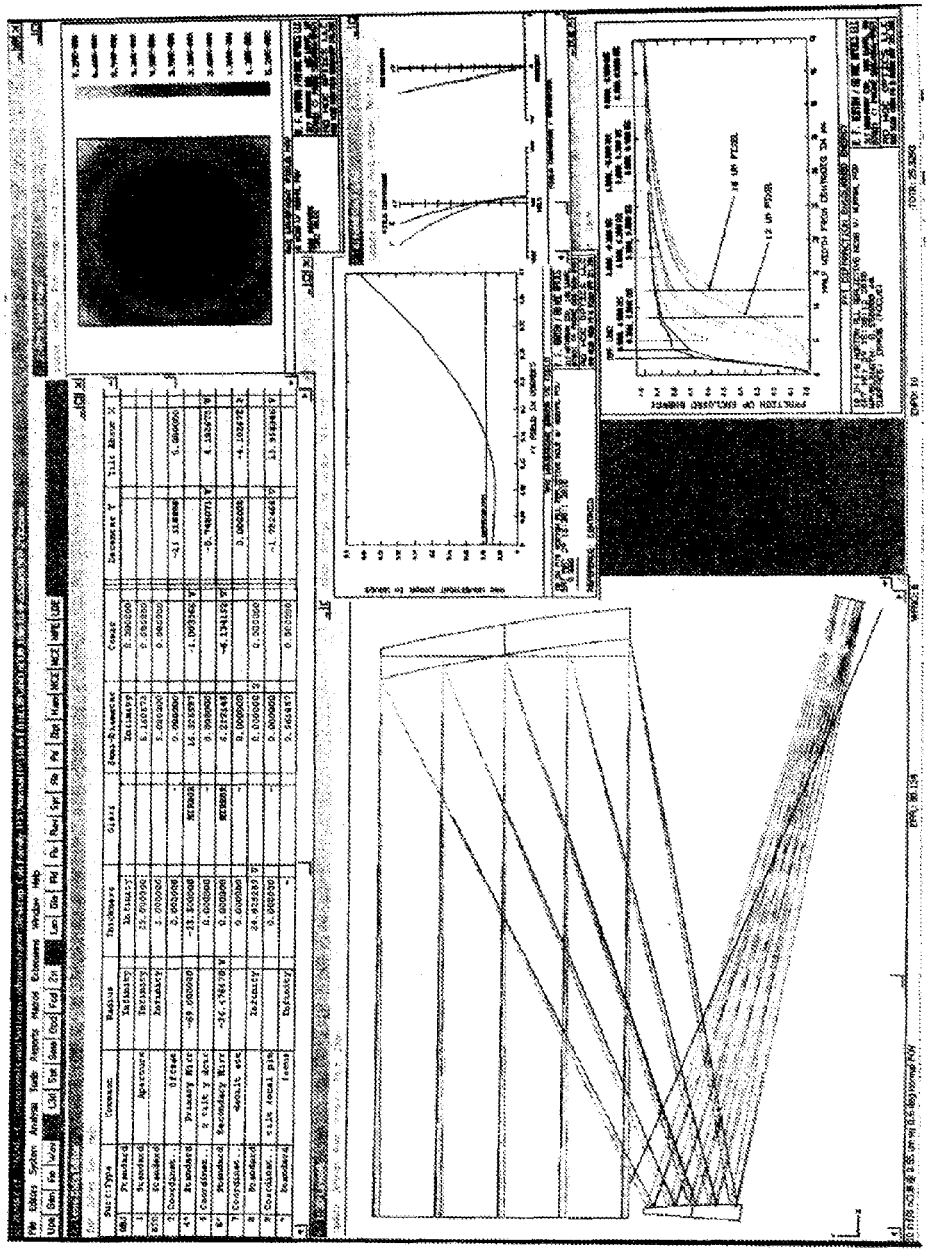
FIG. 19 is ZEMAX screen dump—f/8 nCUB optics and properties
Figure 20:
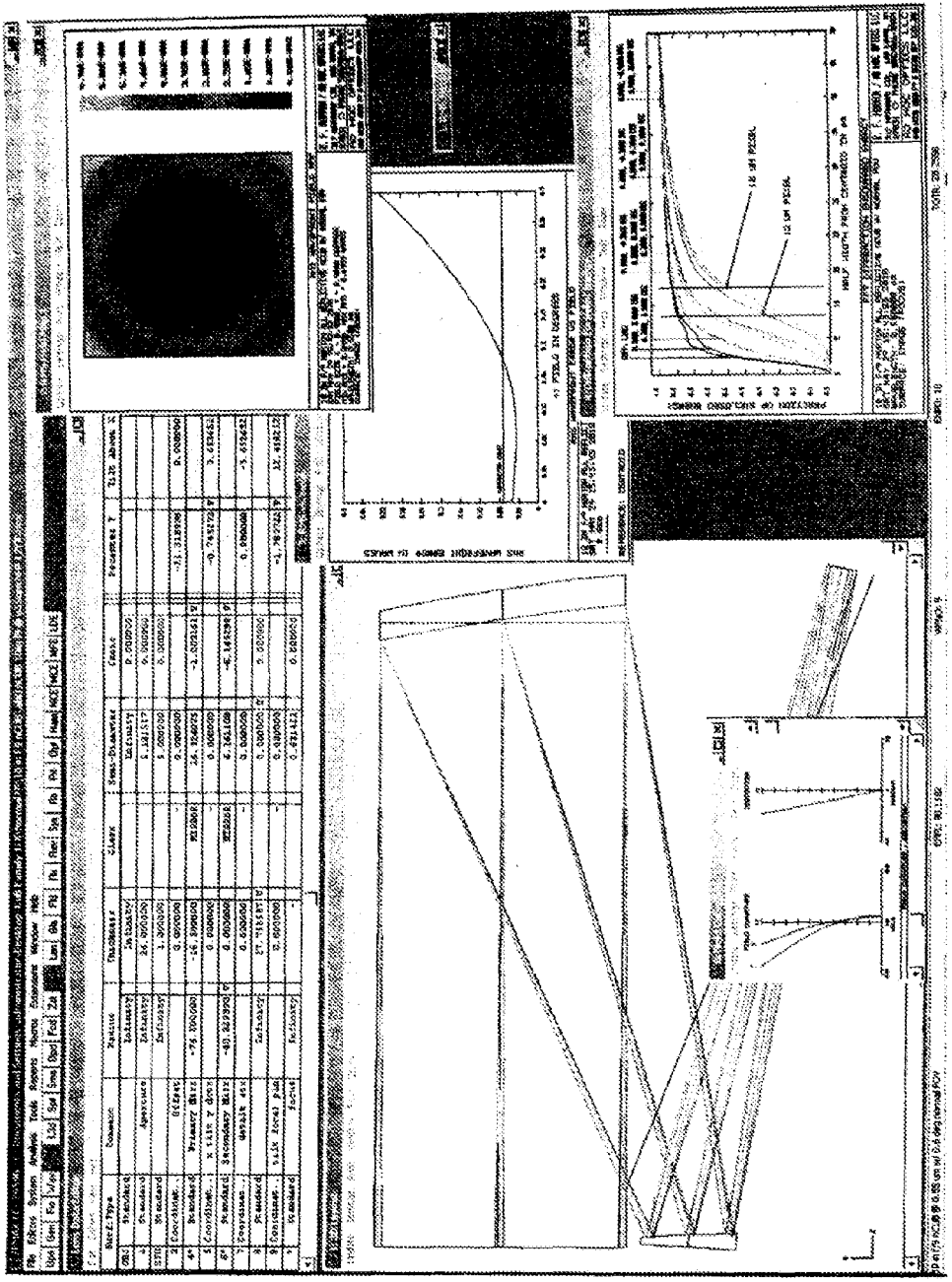
FIG. 20 is ZEMAX screen dump—f/9 nCUB optics and properties
Figure 21:
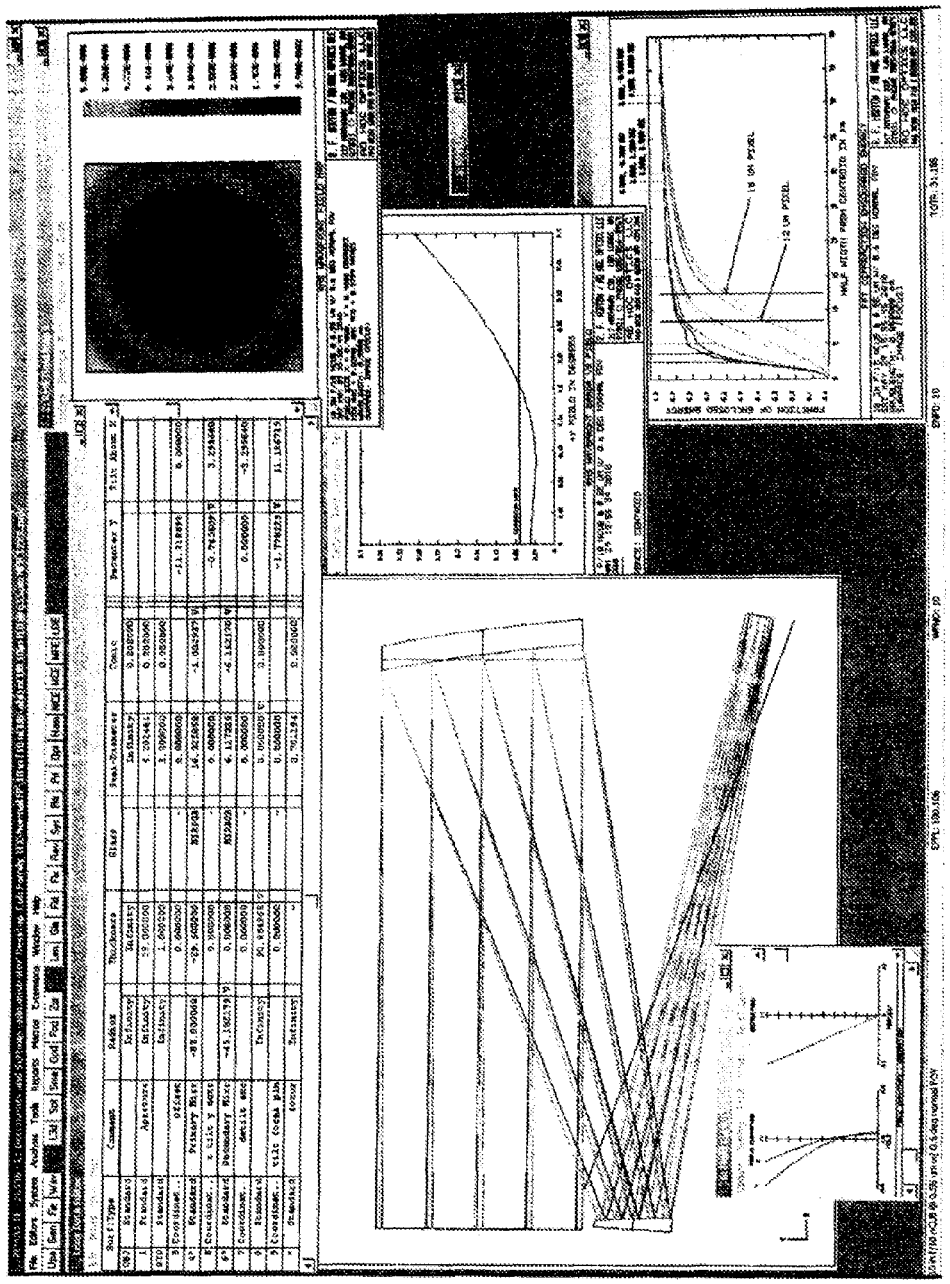
FIG. 21 is ZEMAX screen dump —f/10 nCUB optics and properties
Figure 22:
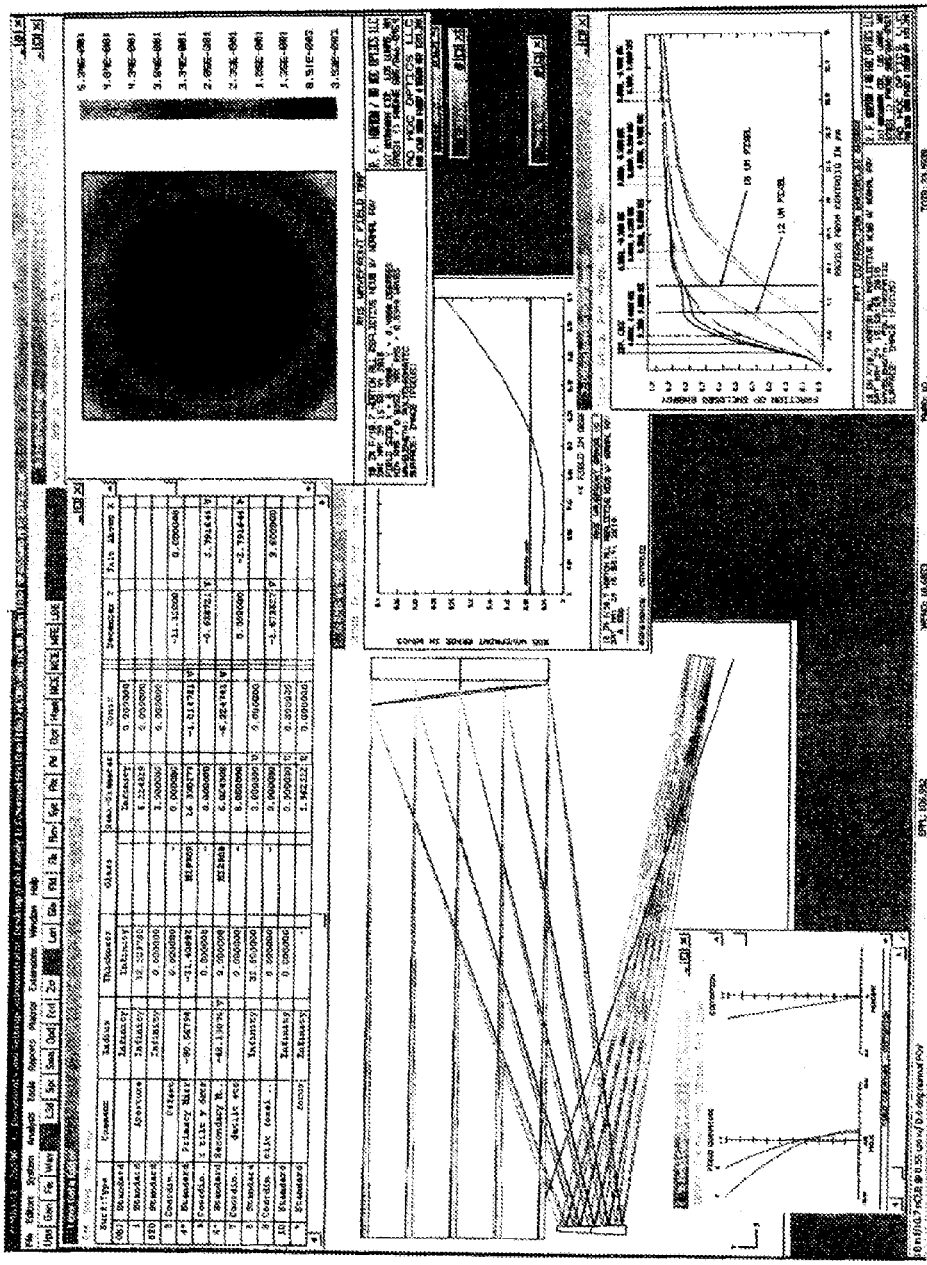
FIG. 22 is ZEMAX screen dump—f/10.7 nCUB optics and properties
Figure 23:
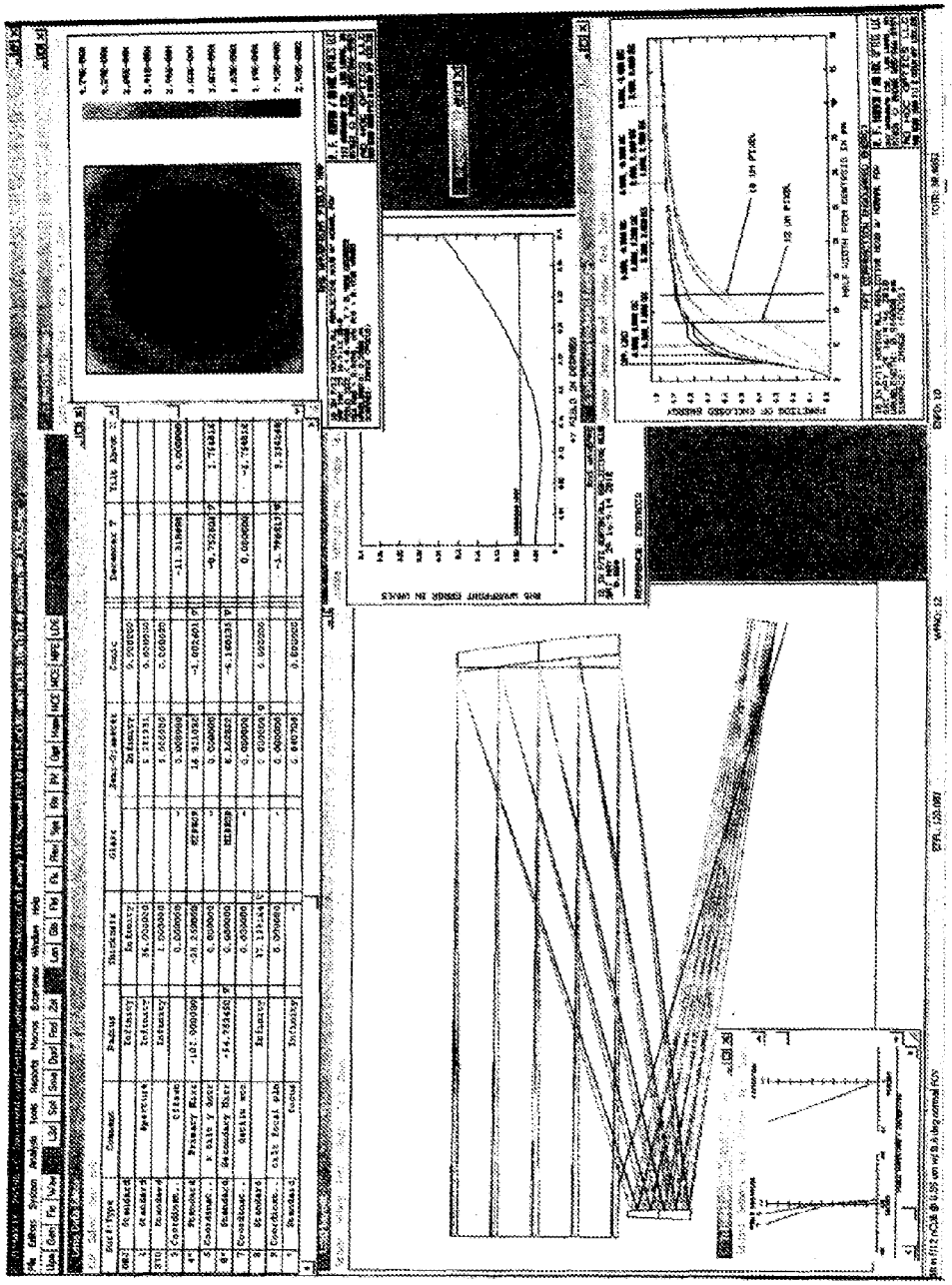
FIG. 23 is ZEMAX screen dump—f/12 nCUB optics and properties
Figure 24:
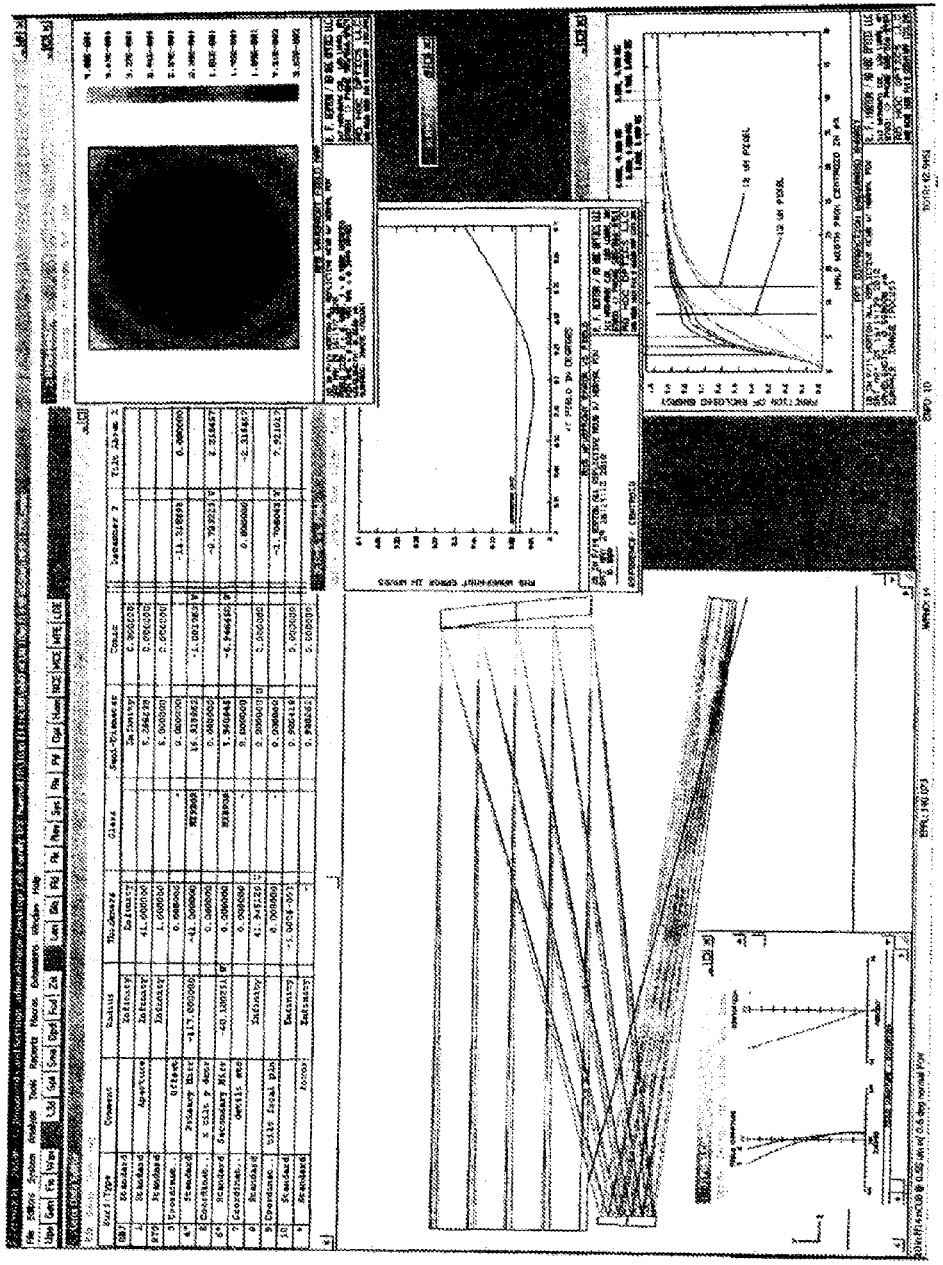
FIG. 24 is ZEMAX screen dump—f/14 nCUB optics and properties
Figure 25:
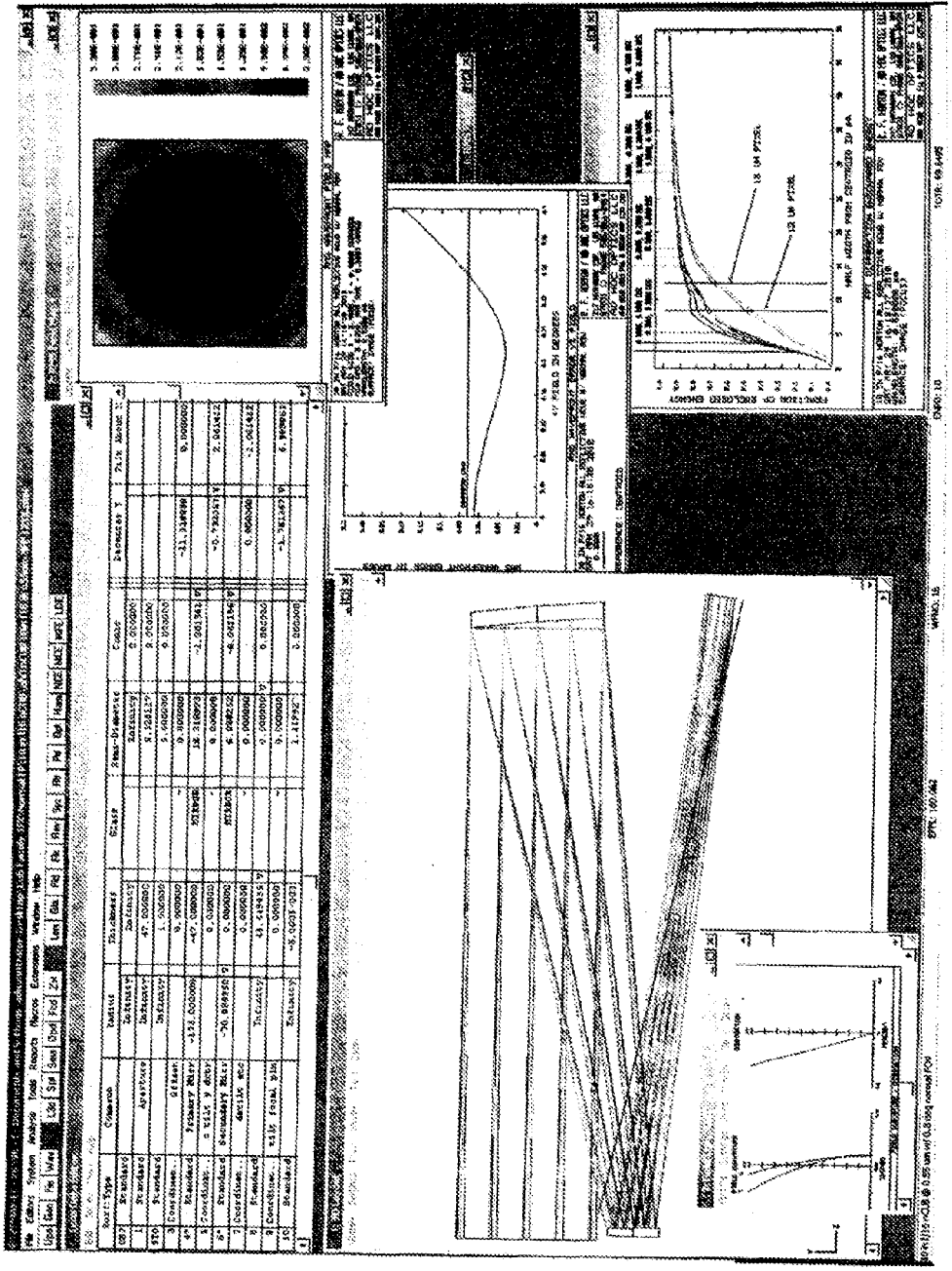
FIG. 25 is ZEMAX screen dump—f/16 nCUB optics and properties
Figure 26:
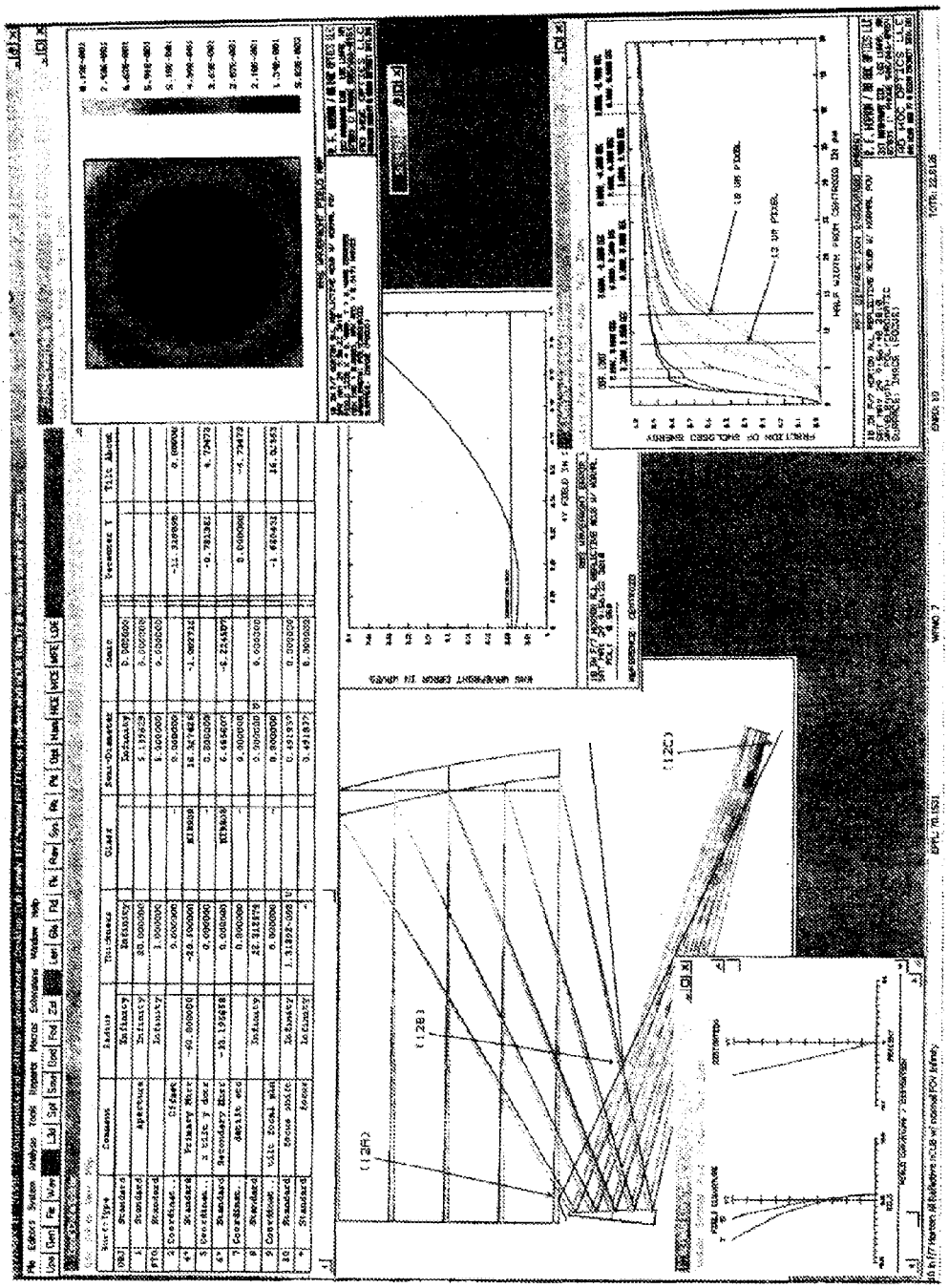
FIG. 26 is ZEMAX screen dump—f/7 system at infinite object distance
Figure 27:
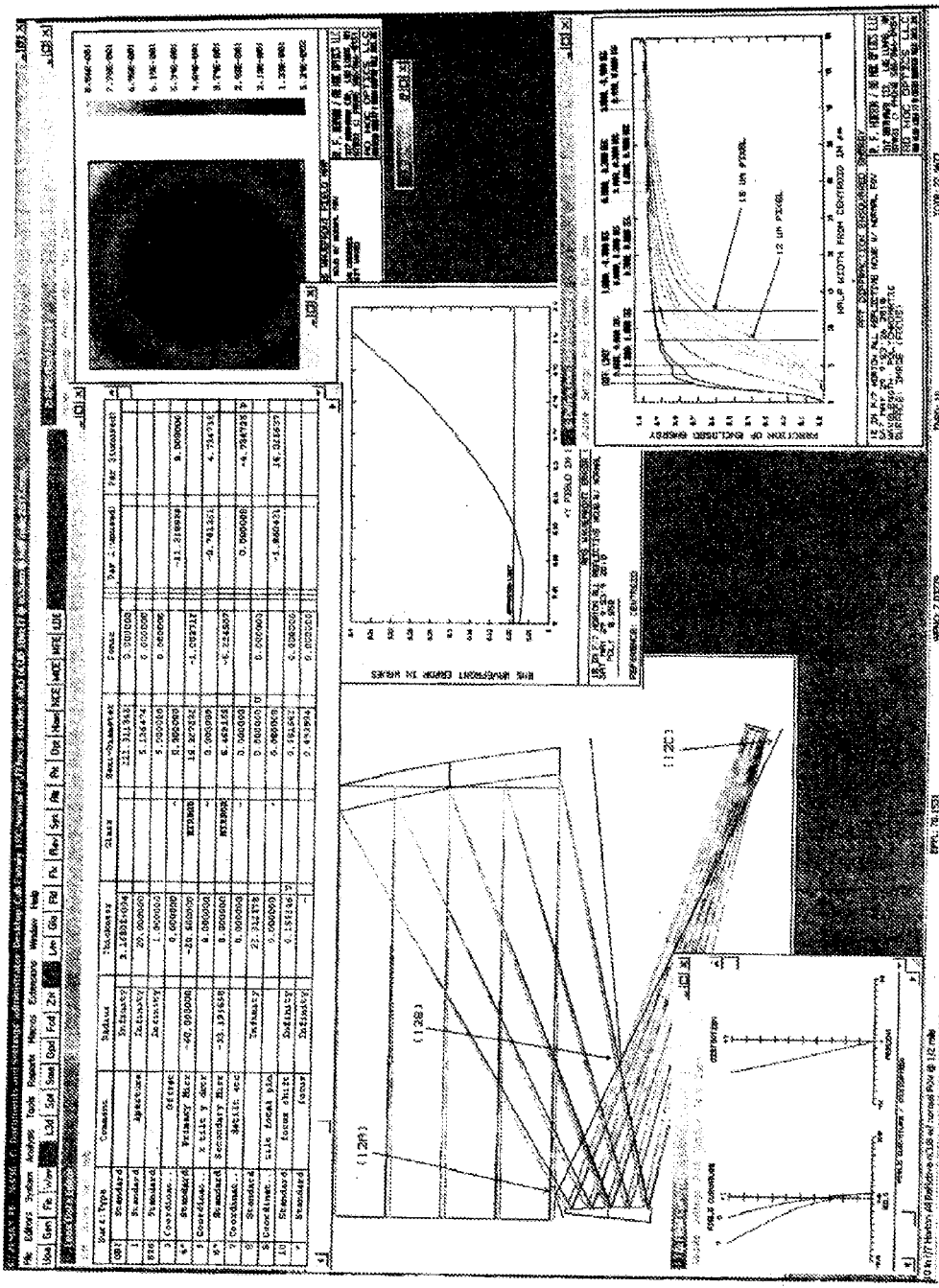
FIG. 27 is ZEMAX screen dump—f/7 system at 2640' object distance
Figure 28:
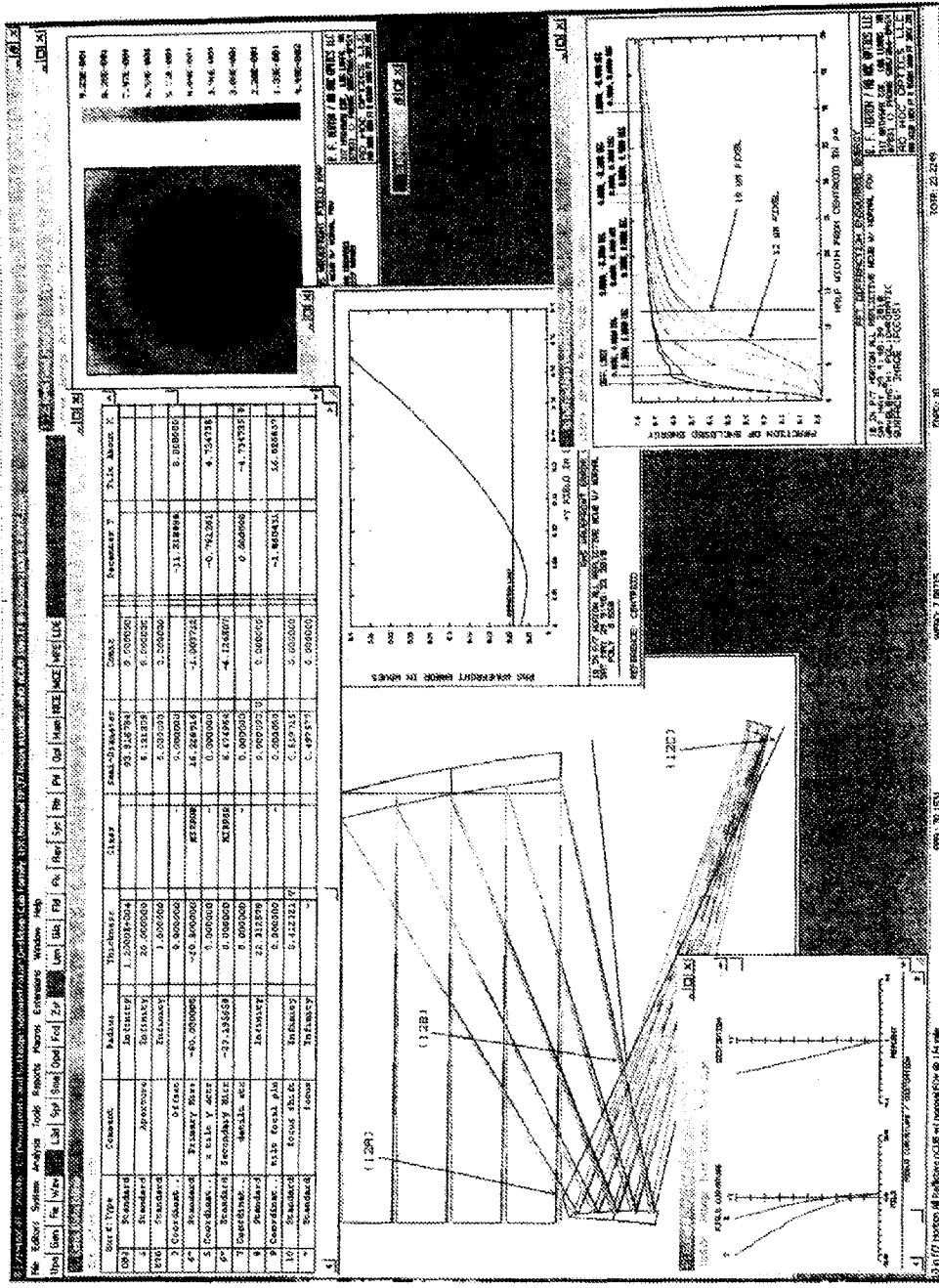
FIG. 28 is ZEMAX screen dump—f/7 system at 1000' object distance
Figure 29:
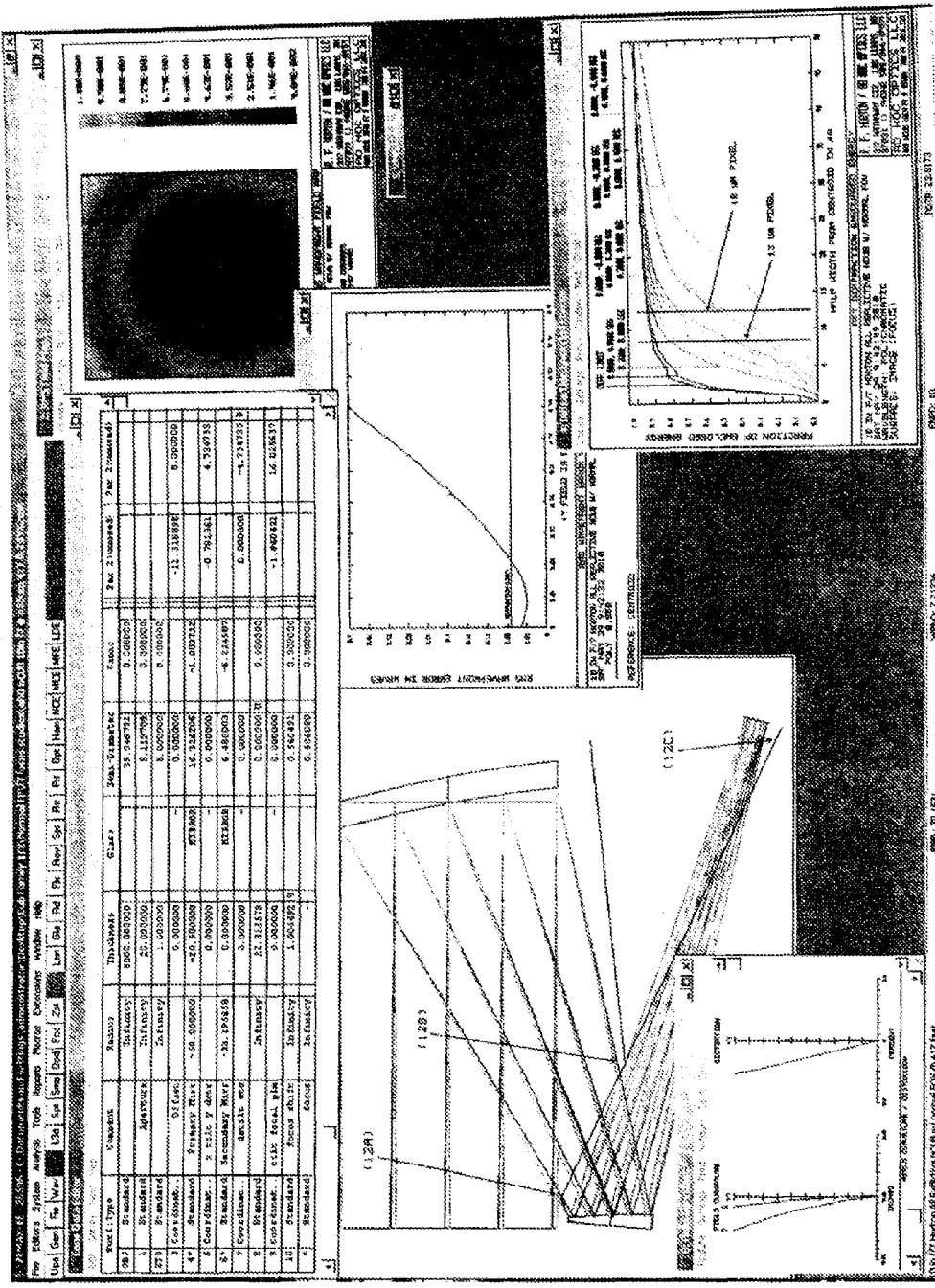
FIG. 29 is ZEMAX screen dump—f/7 system at 417' object distance
Figure 30:
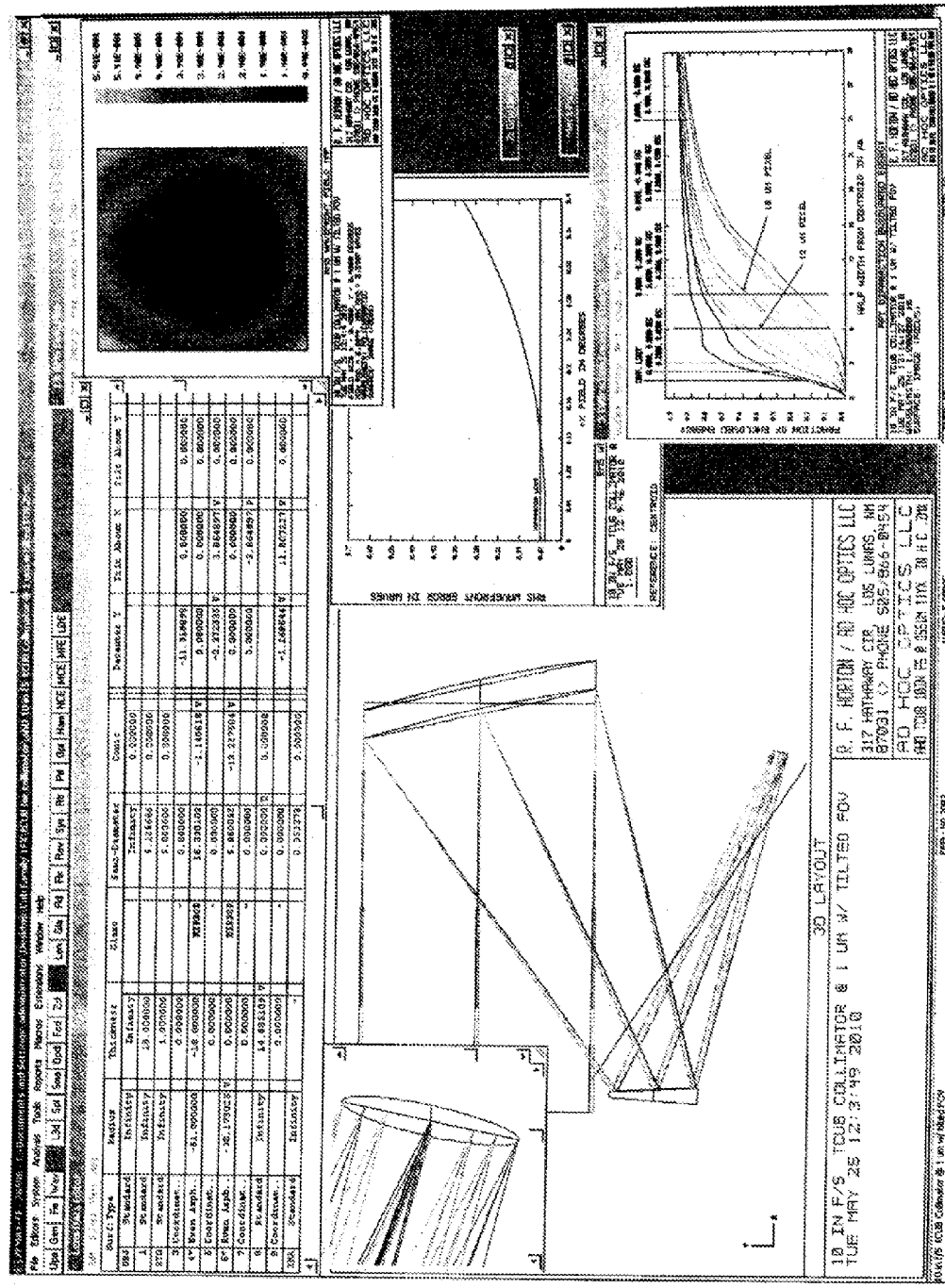
FIG. 30 is ZEMAX screen dump—f/5 tCUB optics and properties
Figure 31:
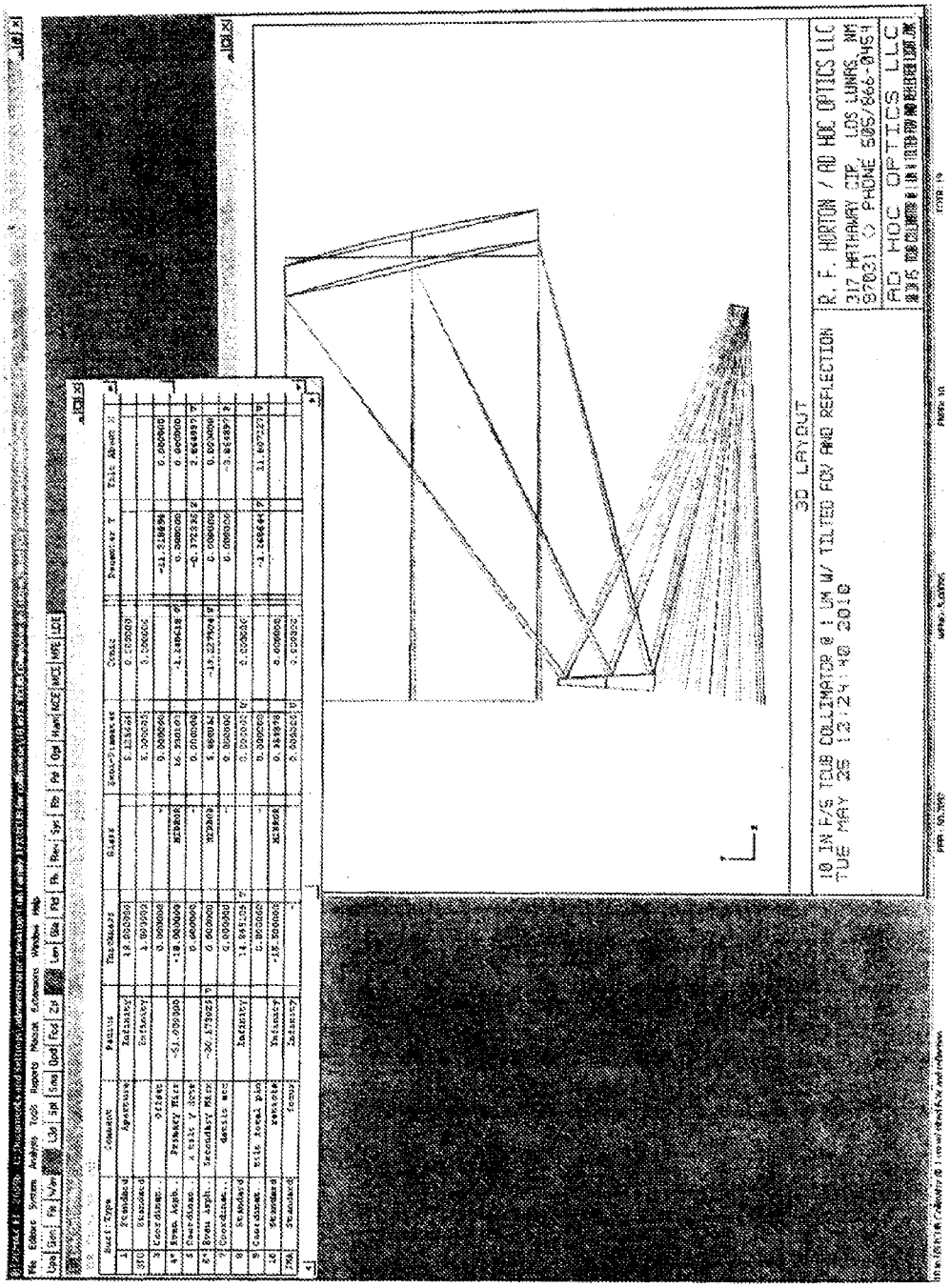
FIG. 31 is ZEMAX screen dump—f/5 tCUB stray light control
Figure 32:
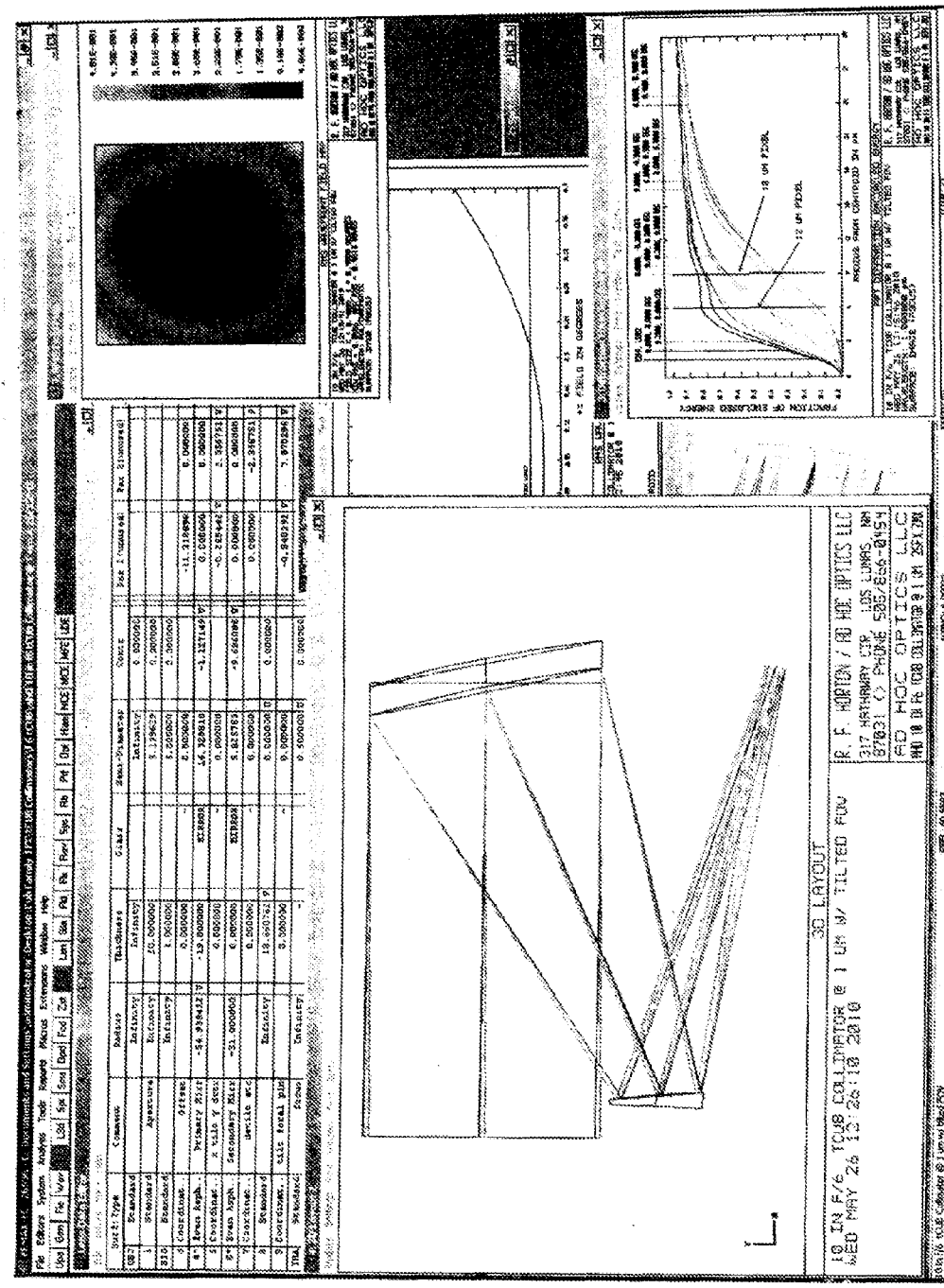
FIG. 32 is ZEMAX screen dump—f/6 tCUB optics and properties
Figure 33:
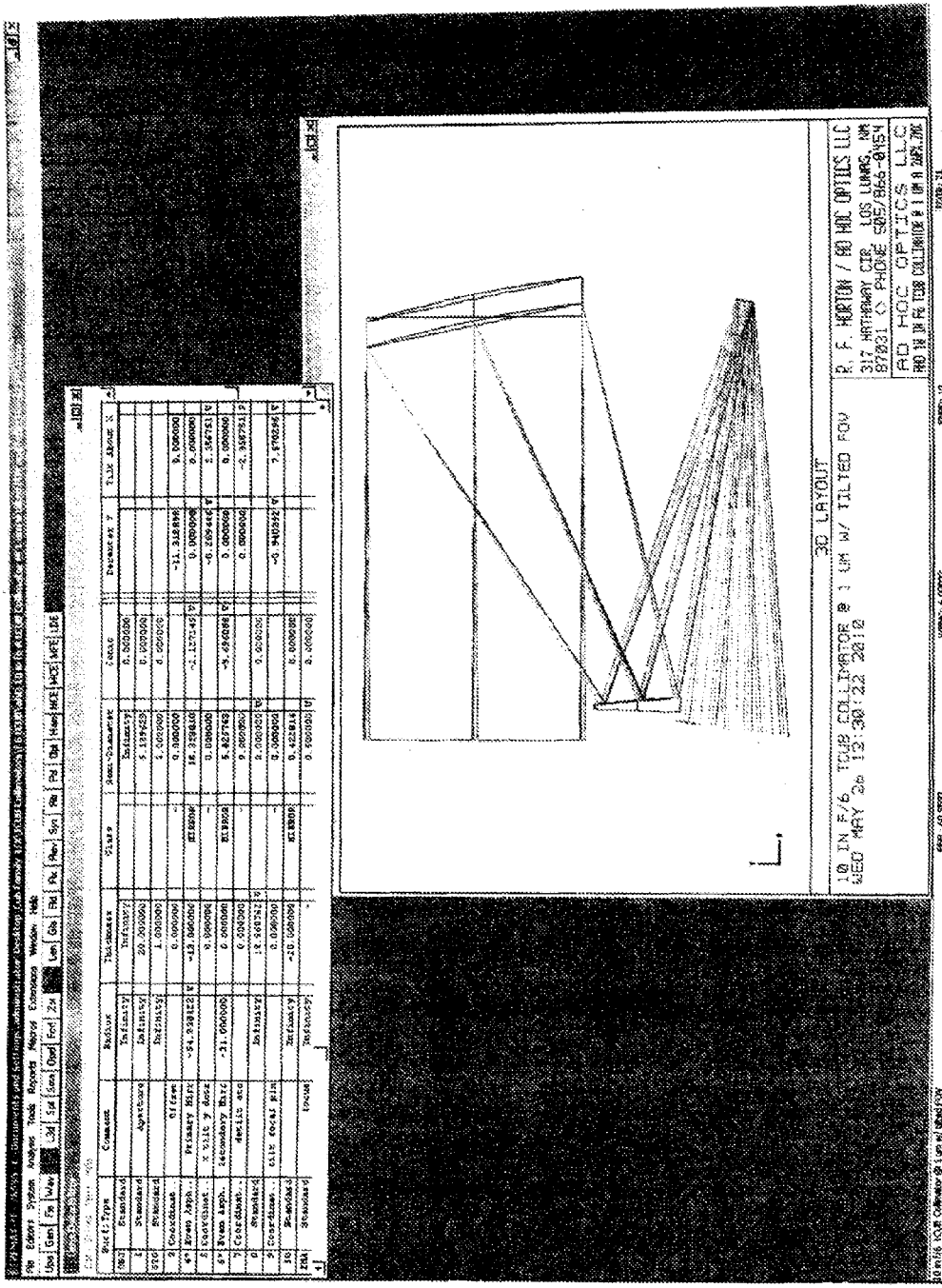
FIG. 33 is ZEMAX screen dump—f/6 tCUB stray light control
Figure 34:
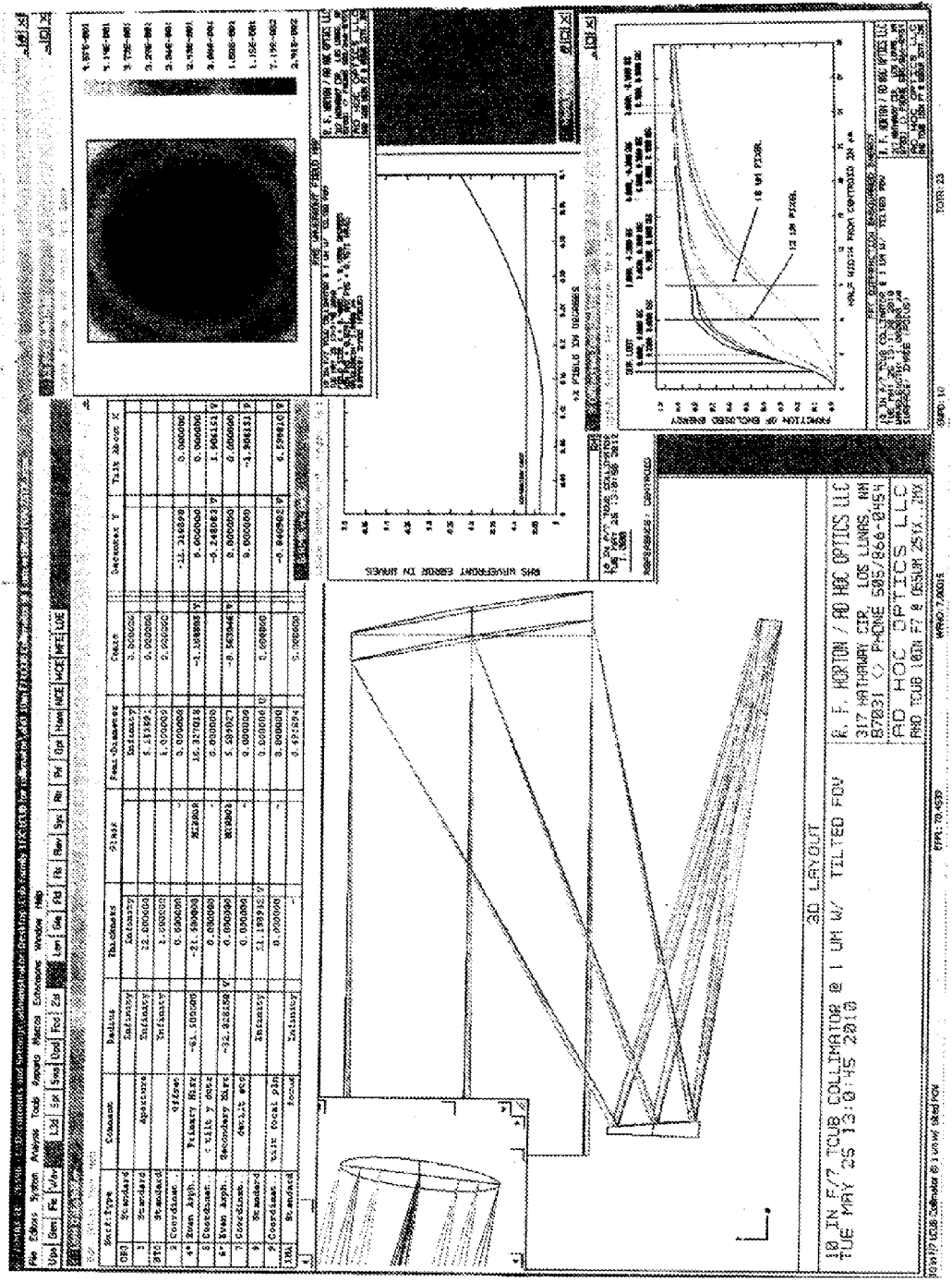
FIG. 34 is ZEMAX screen dump—f/7 tCUB optics and properties
Figure 35:
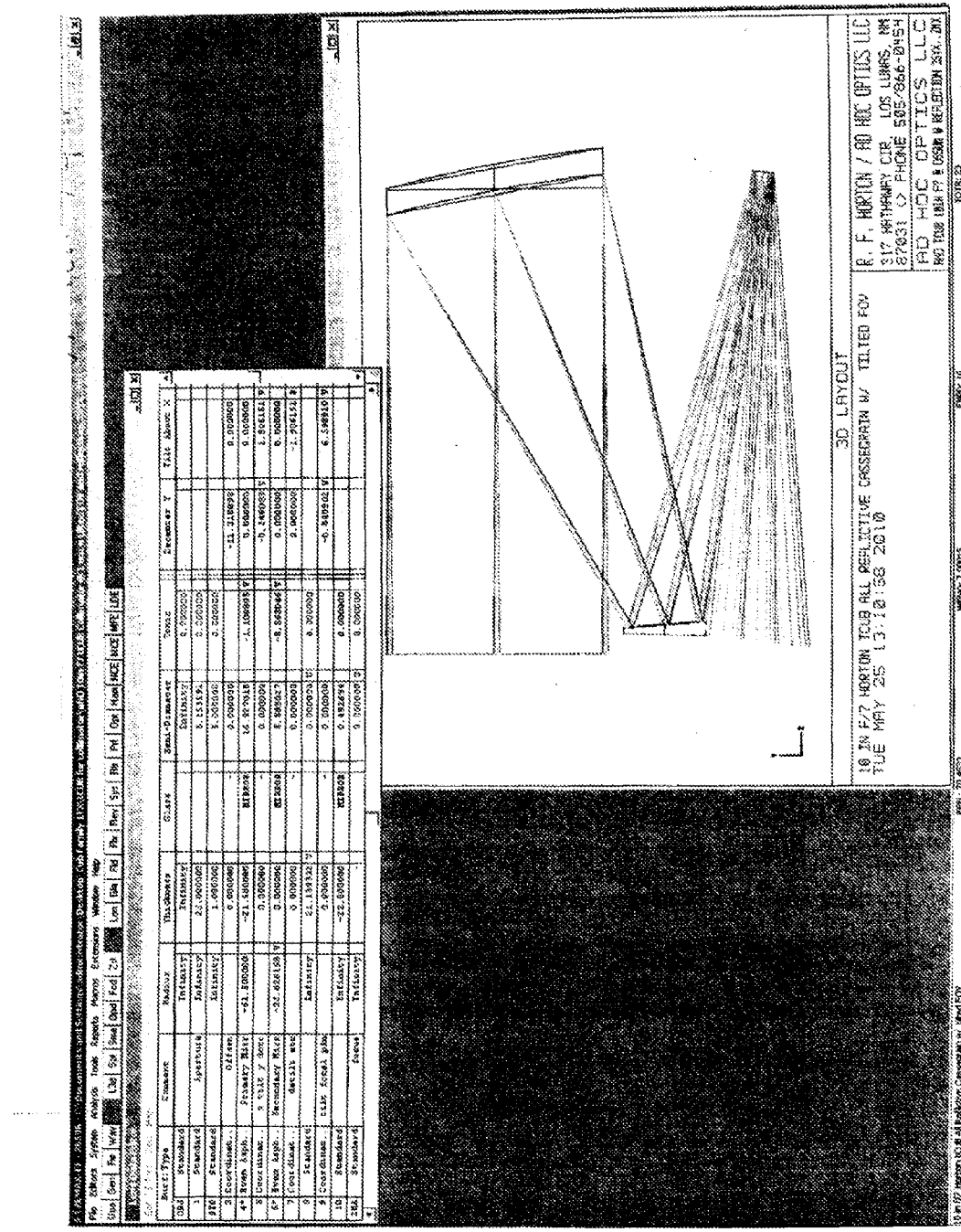
FIG. 35 is ZEMAX screen dump—f/7 tCUB stray light control
Figure 36:
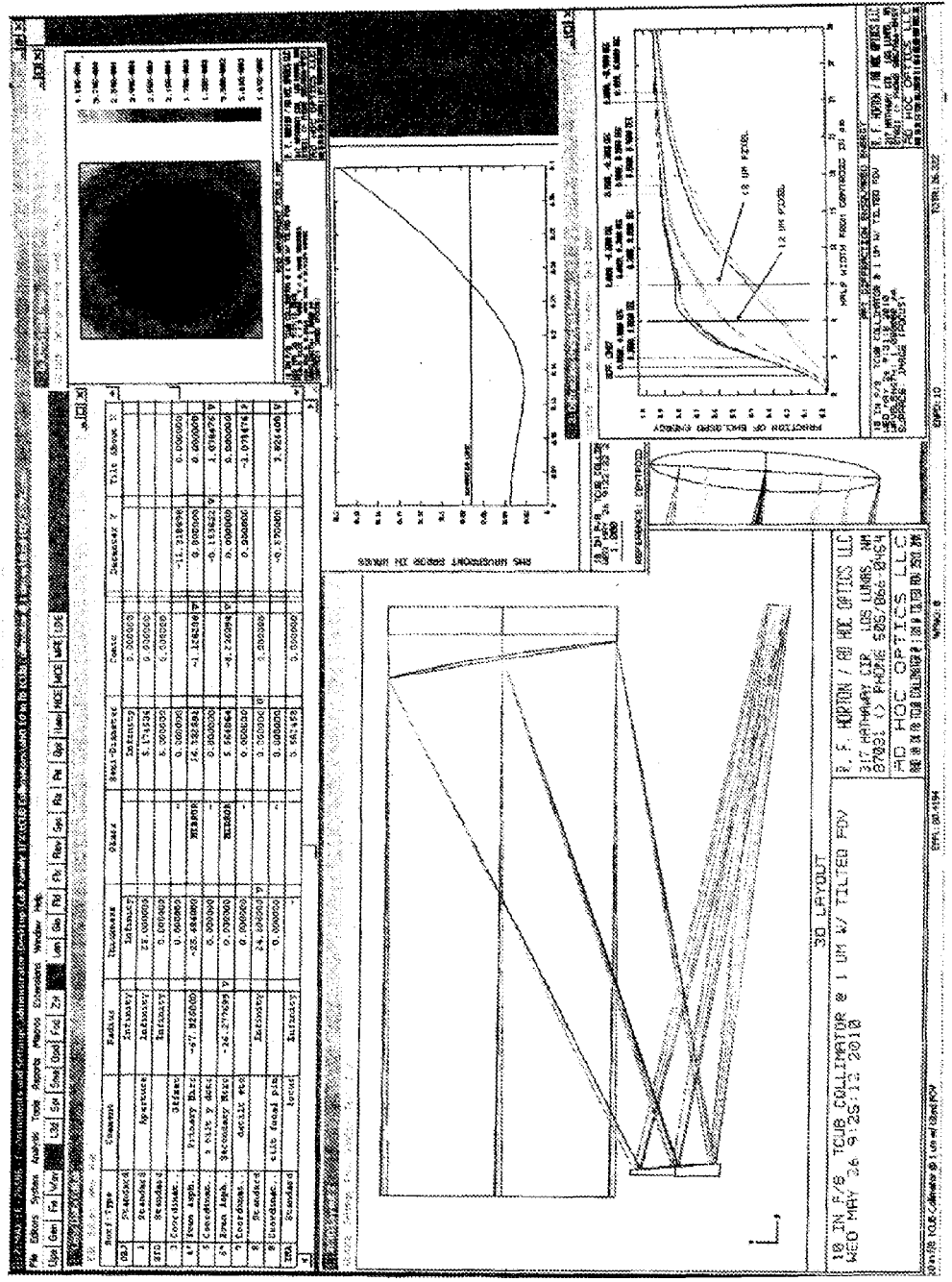
FIG. 36 is ZEMAX screen dump—f/8 tCUB optics and properties
Figure 37:
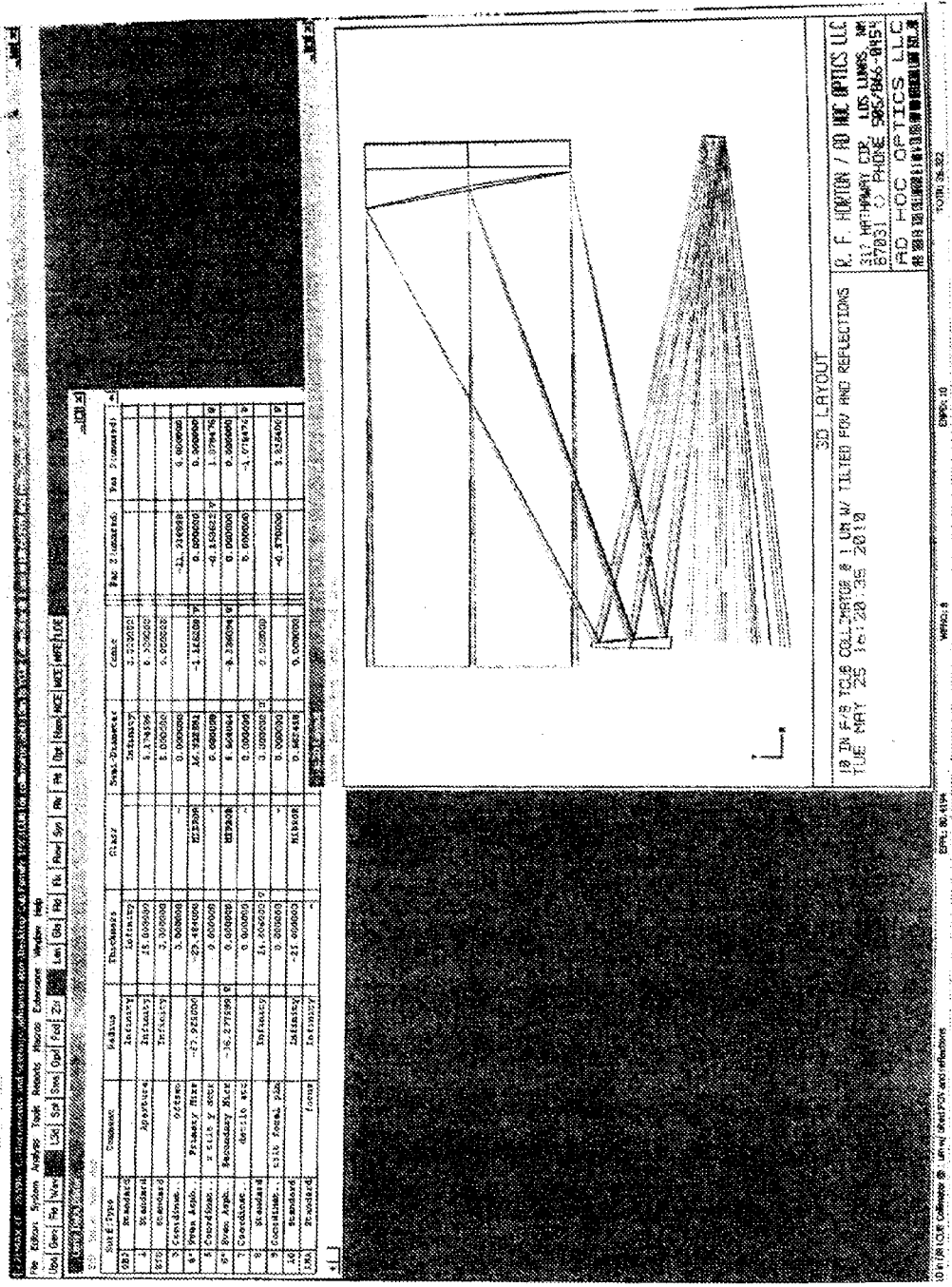
FIG. 37 is ZEMAX screen dump—f/8 tCUB stray light control
Figure 38:
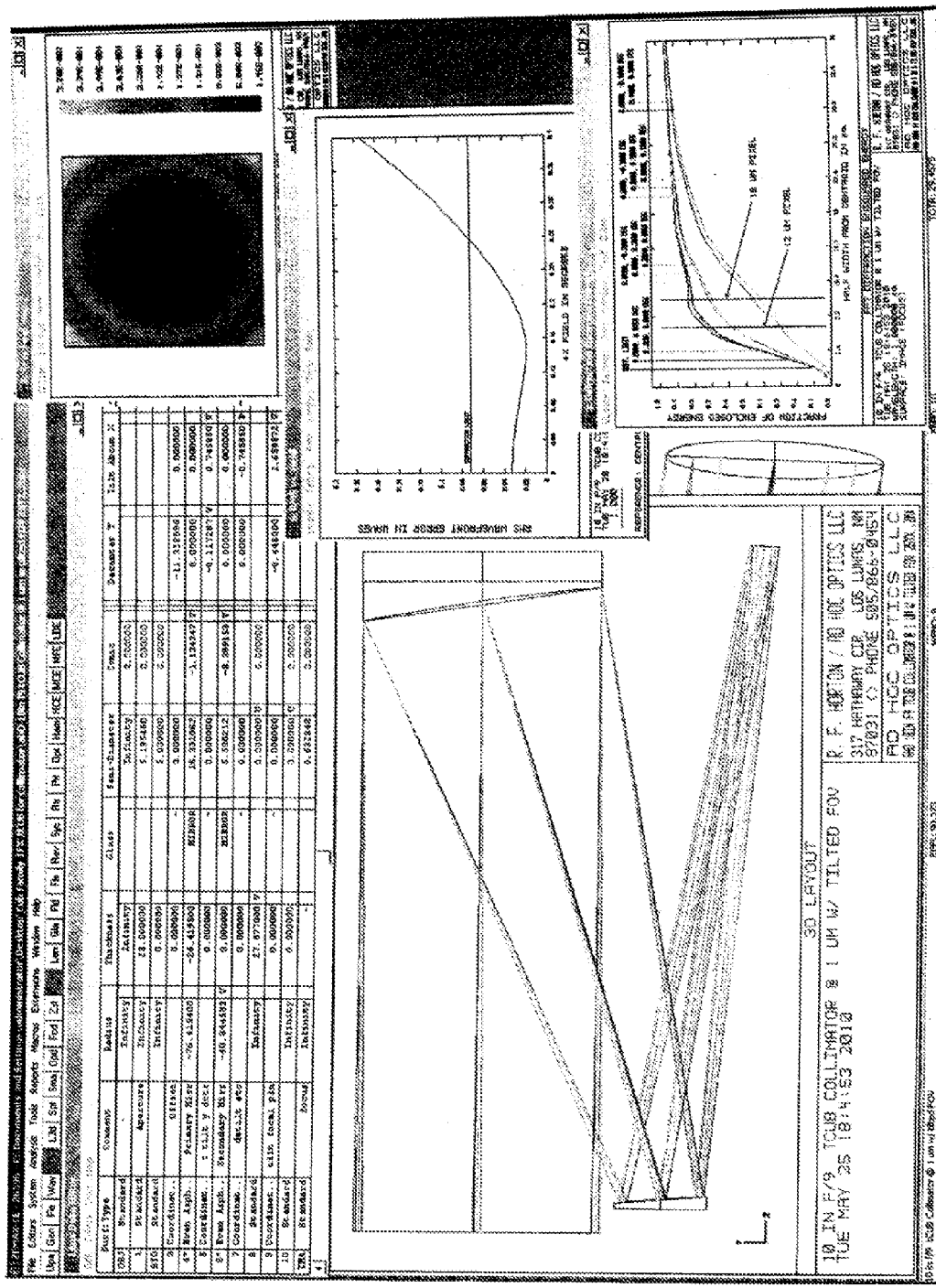
FIG. 38 is ZEMAX screen dump—f/9 tCUB optics and properties
Figure 39:
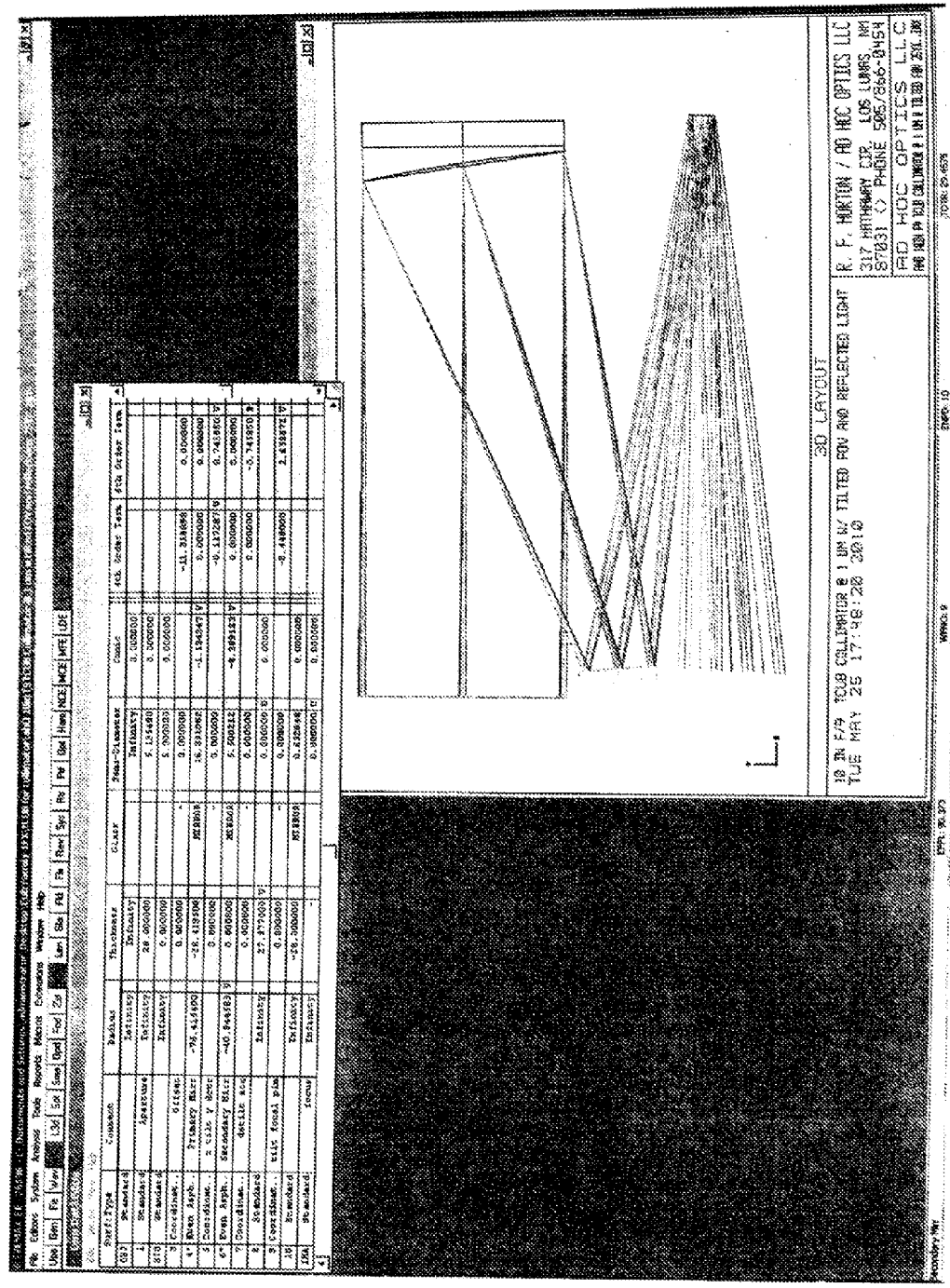
FIG. 39 is ZEMAX screen dump—f/9 tCUB stray light control
Figure 40:
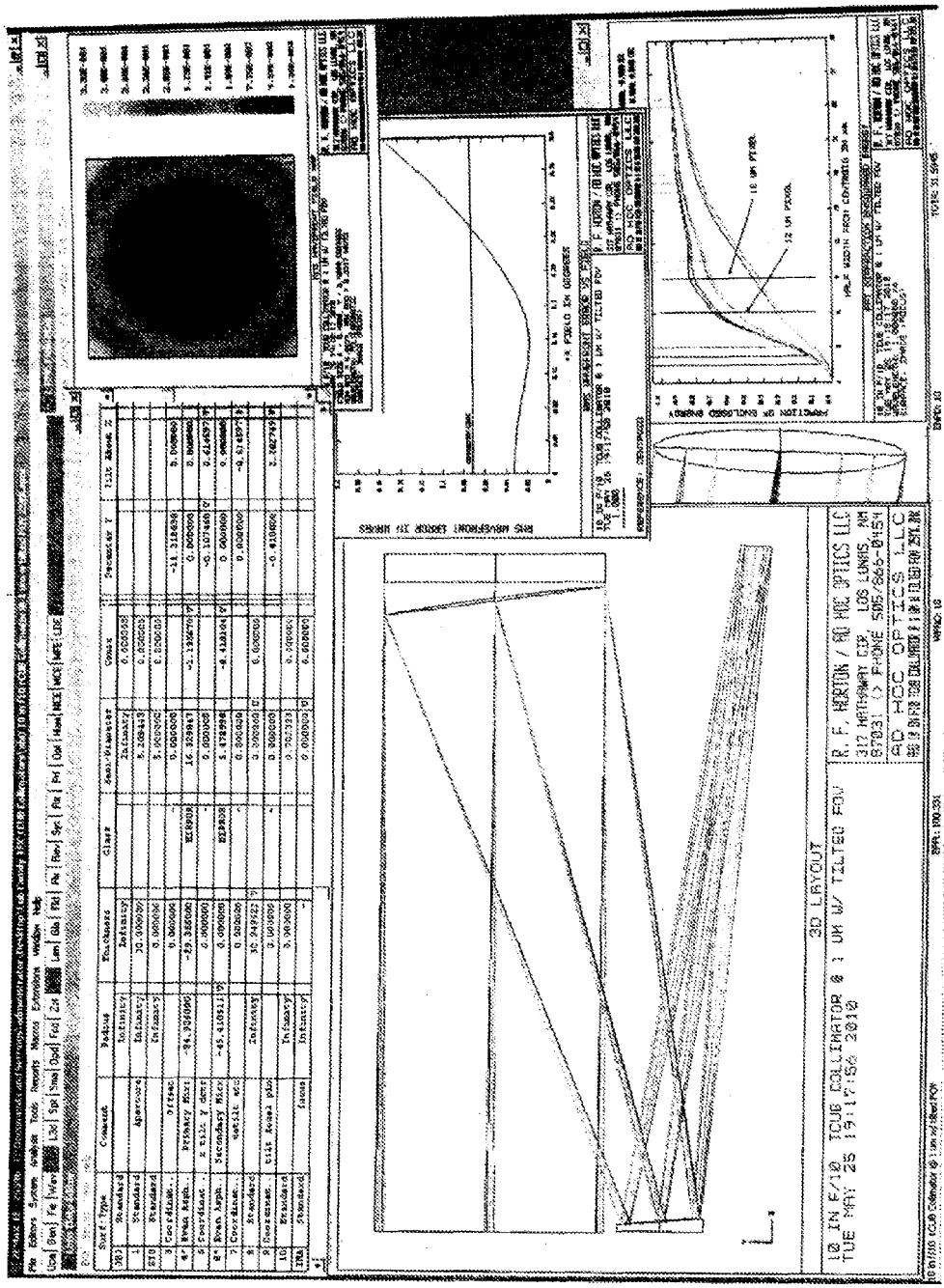
FIG. 40 is ZEMAX screen dump—f/10 tCUB optics and properties
Figure 41:
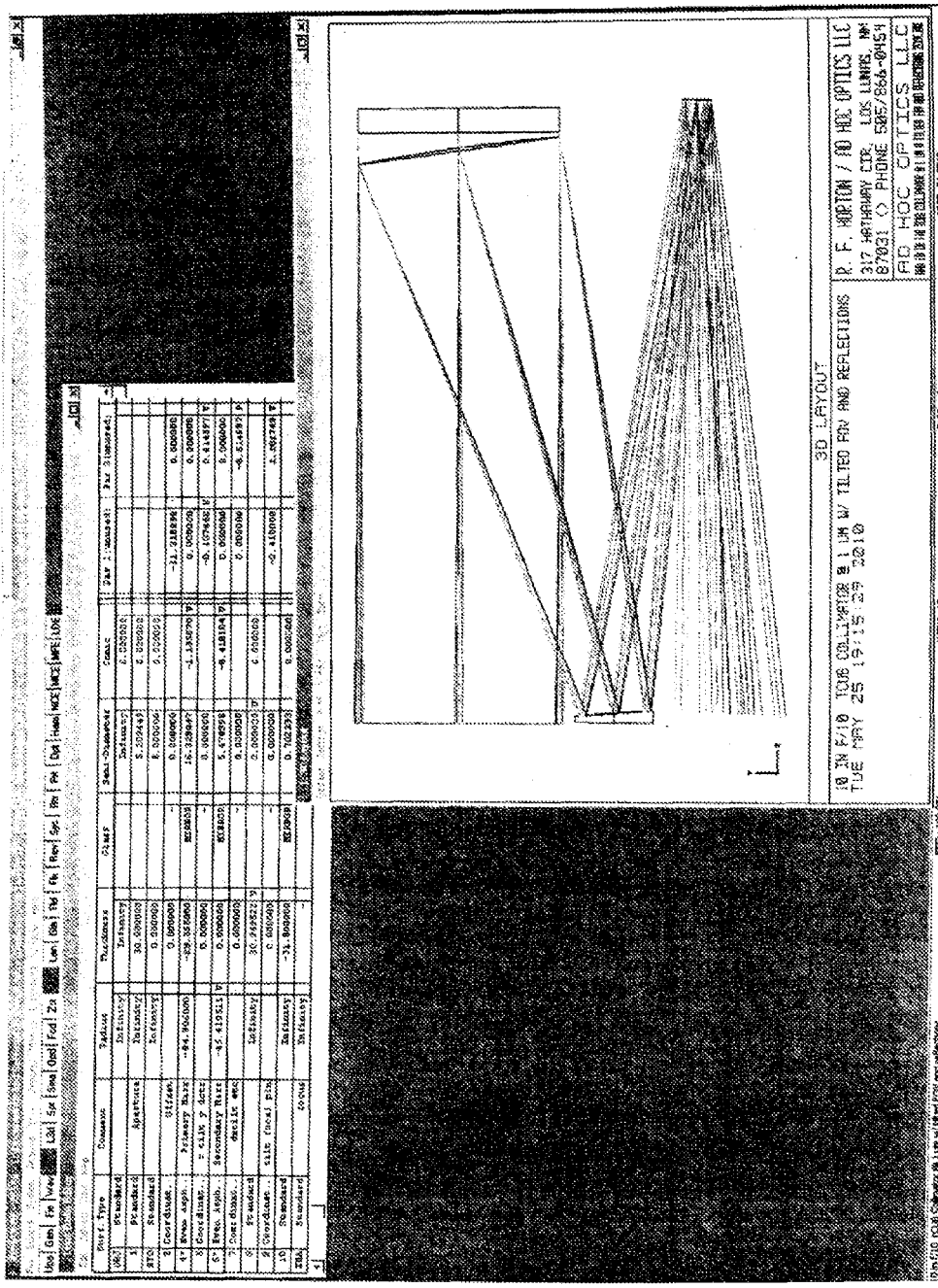
FIG. 41 is ZEMAX screen dump—f/10 tCUB stray light control
Figure 42:
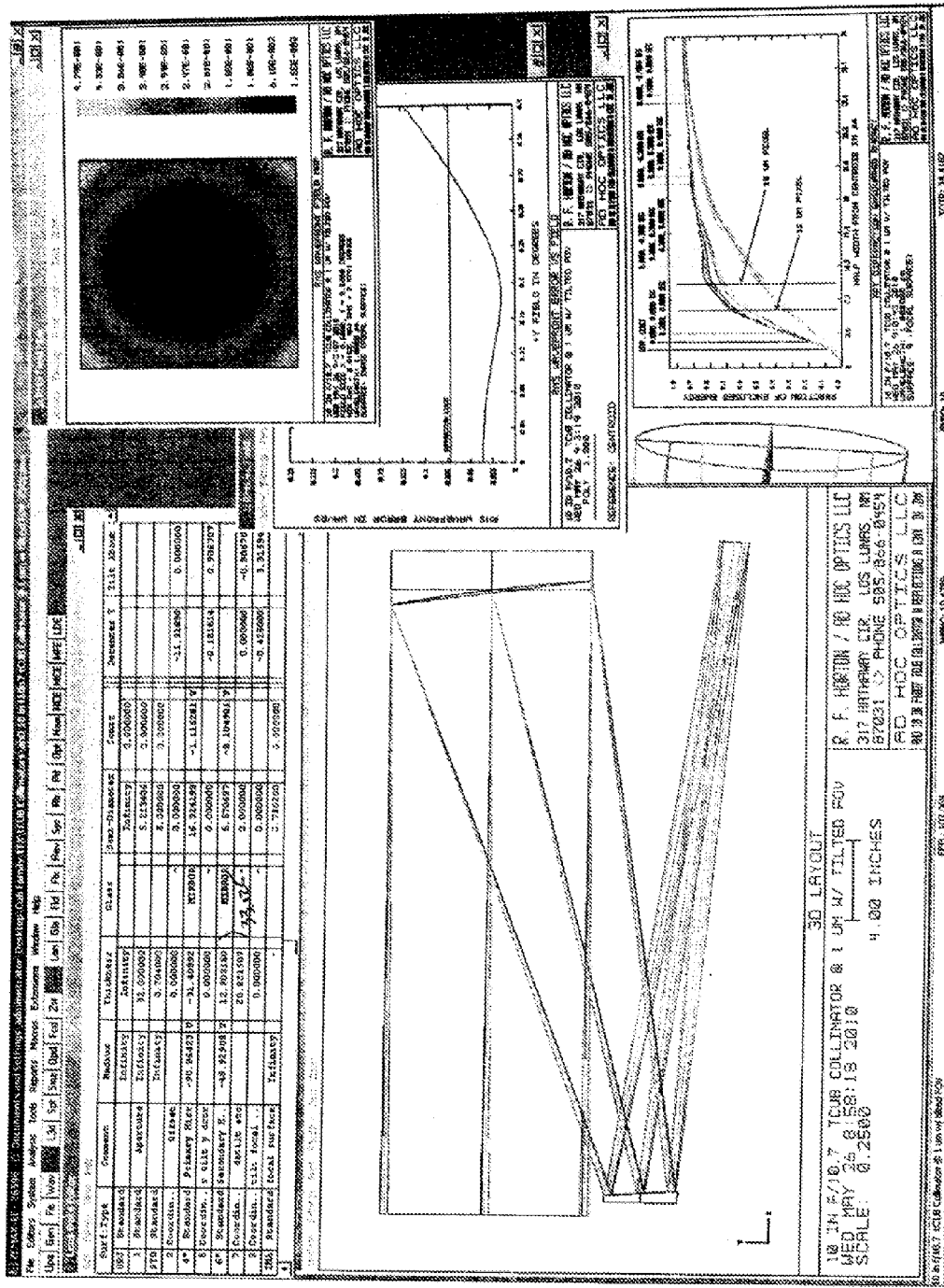
FIG. 42 is ZEMAX screen dump—f/10.7 tCUB optics and properties
Figure 43:
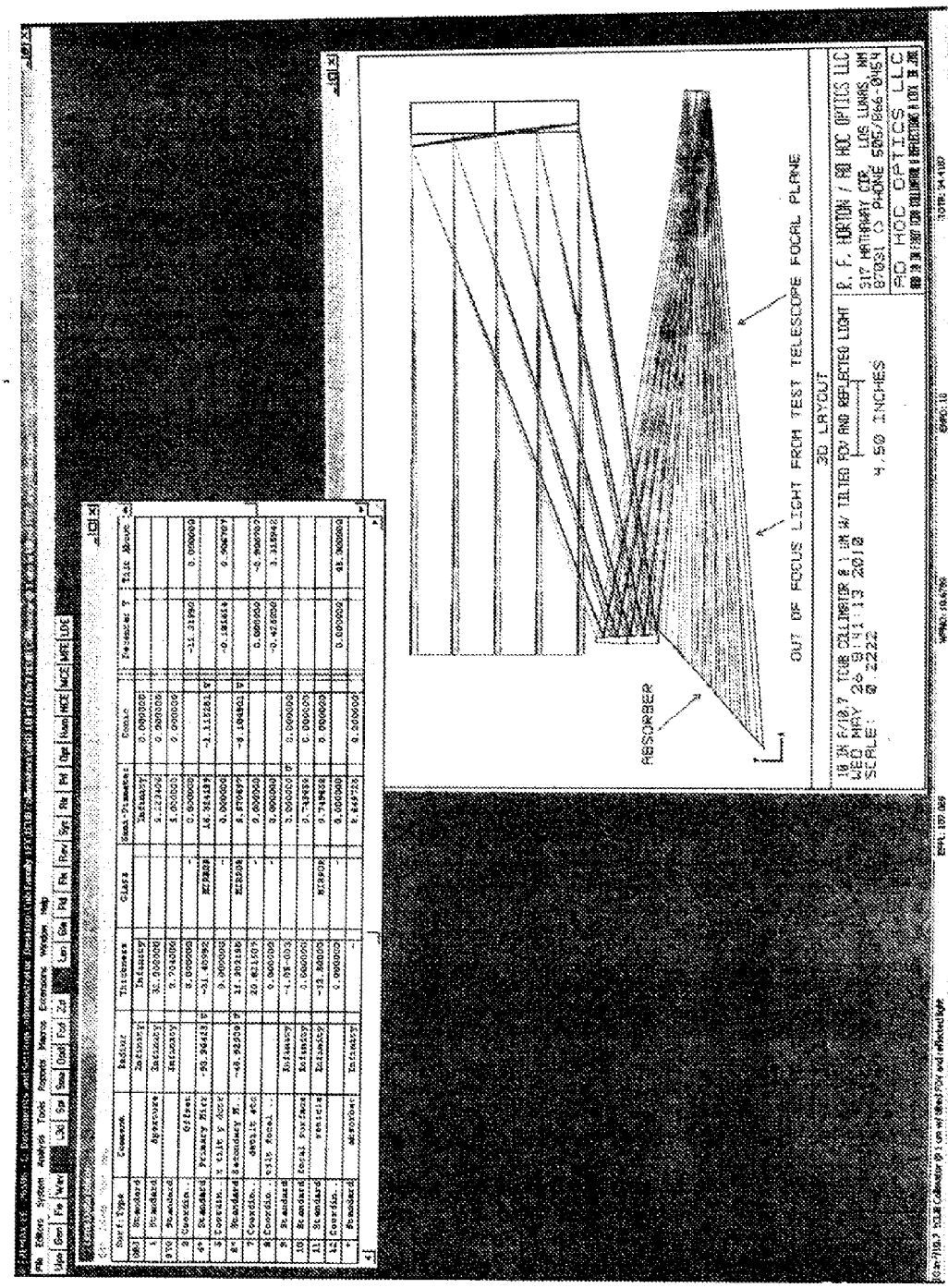
FIG. 43 is ZEMAX screen dump—f/10.7 tCUB stray light control
Figure 44:
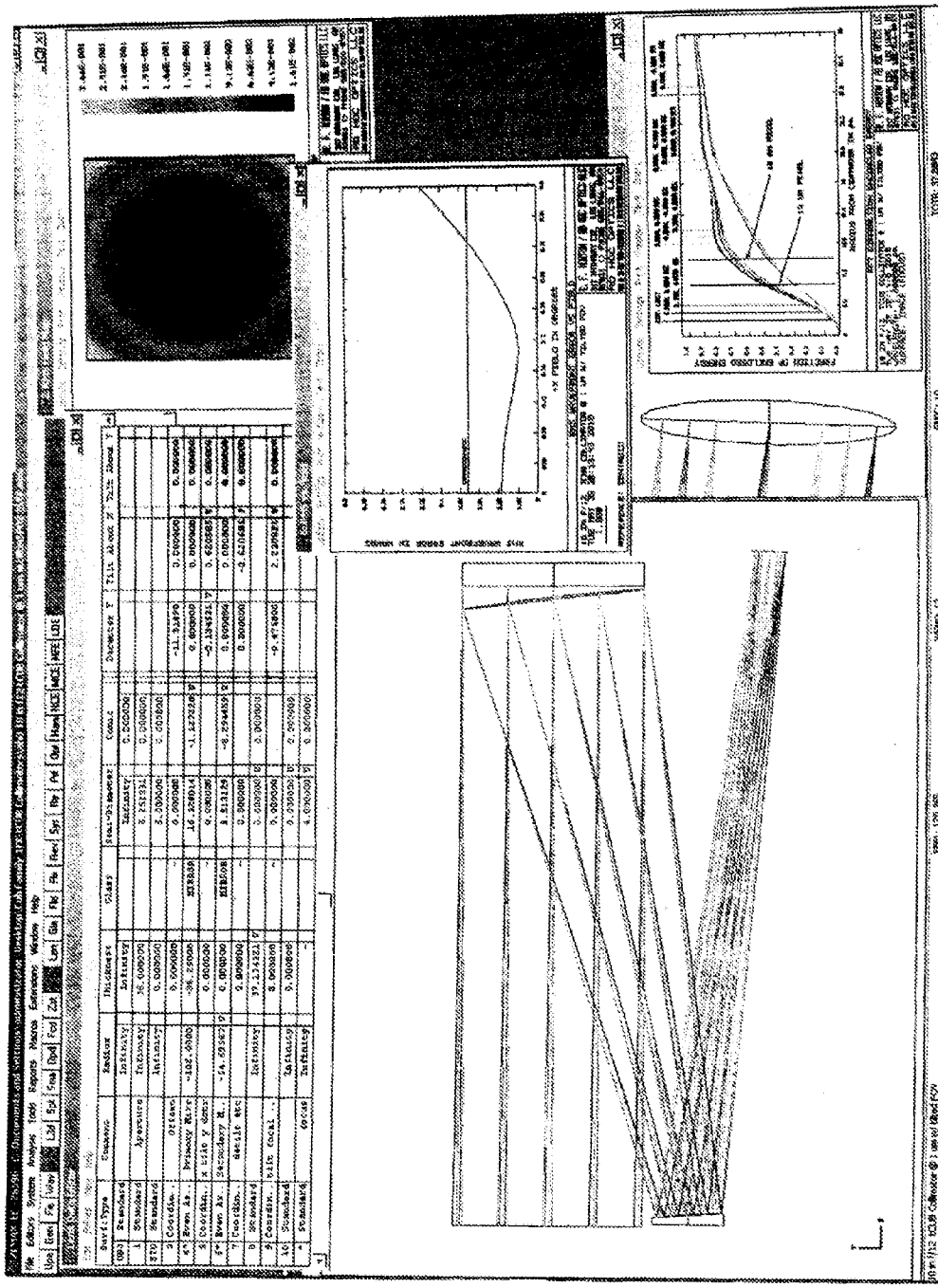
FIG. 44 is ZEMAX screen dump—f/12 tCUB optics and properties
Figure 45:
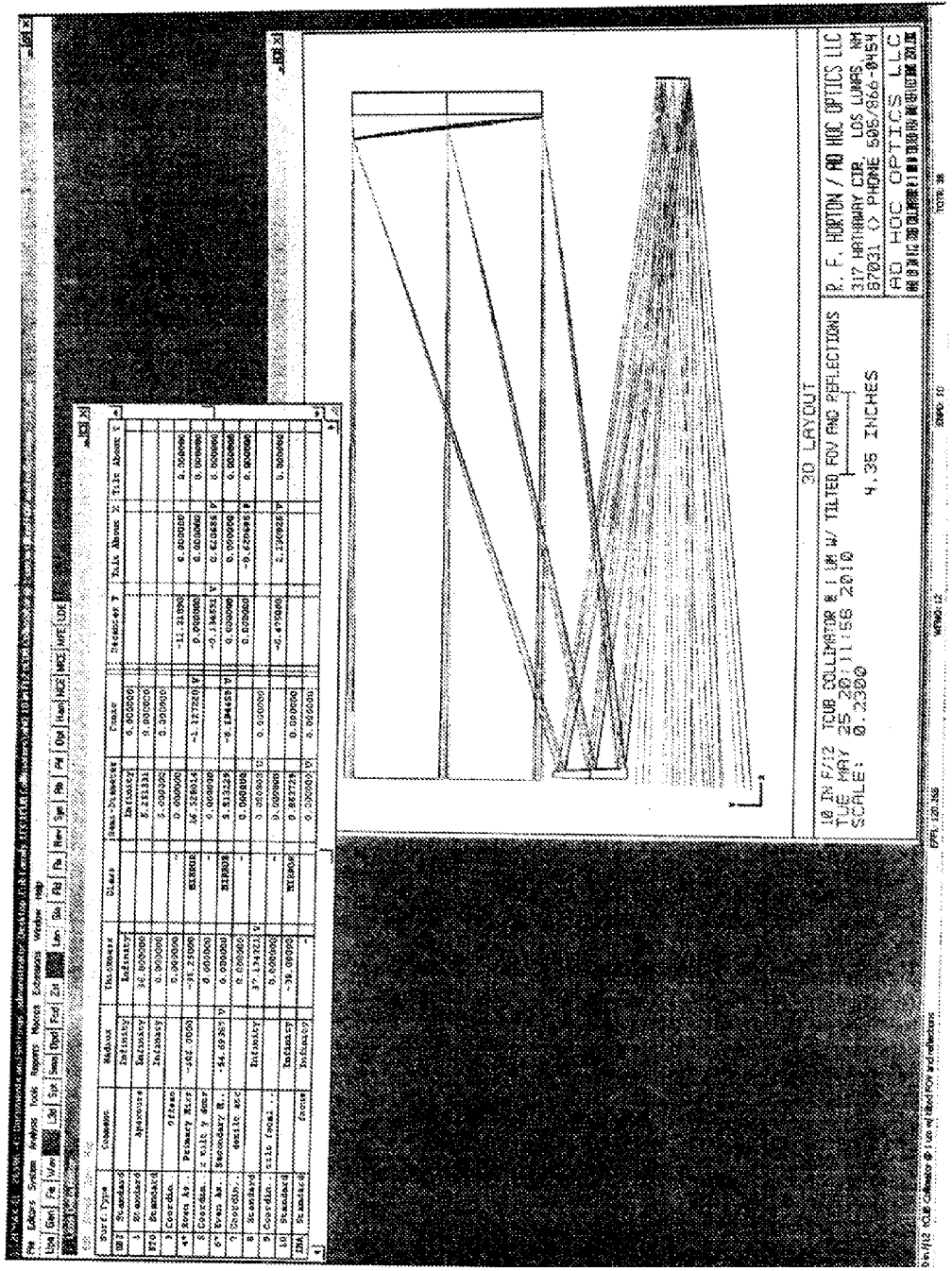
FIG. 45 is ZEMAX screen dump—f/12 tCUB stray light control
Figure 46:
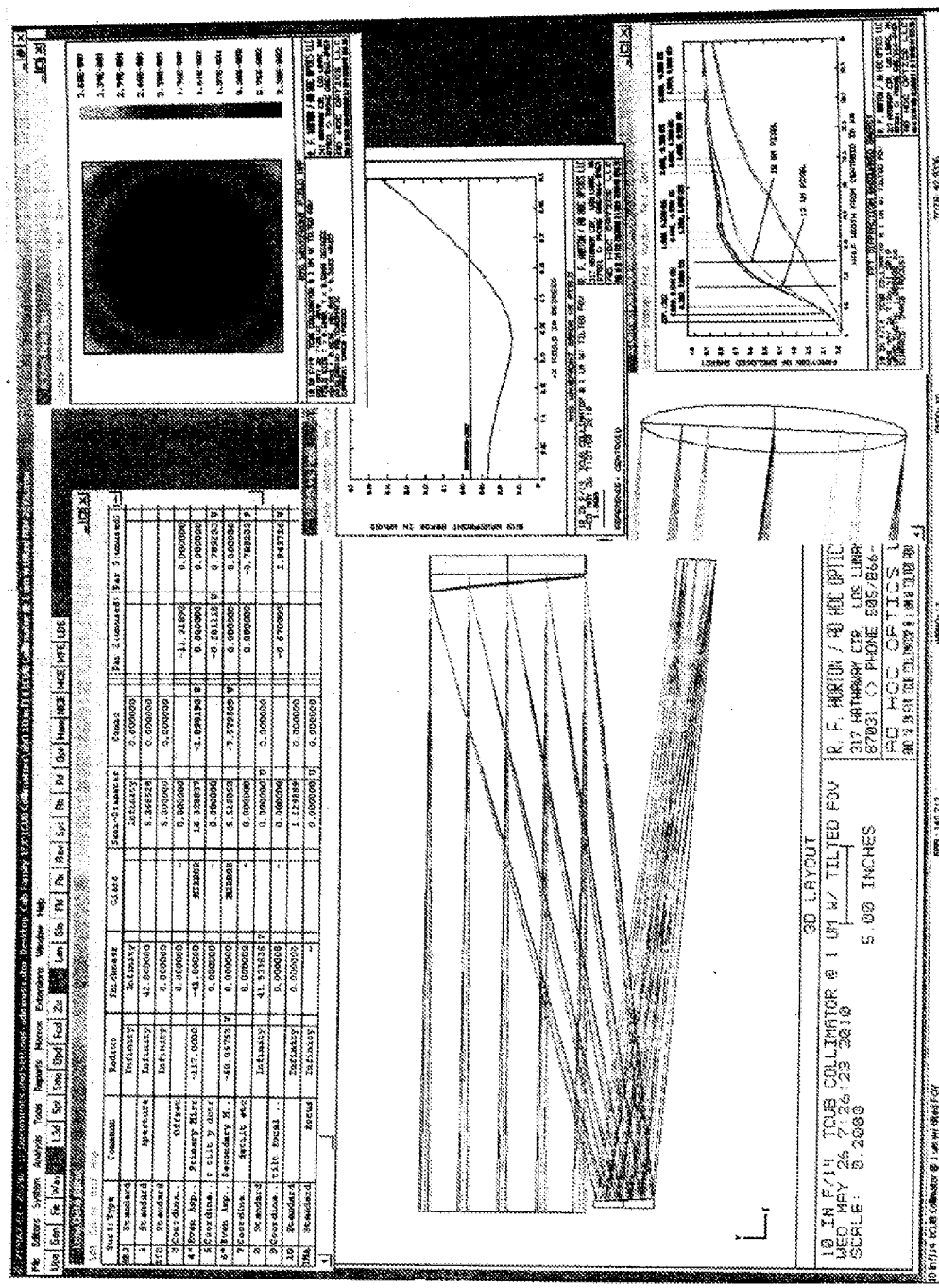
FIG. 46 is ZEMAX screen dump—f/14 tCUB optics and properties
Figure 47:
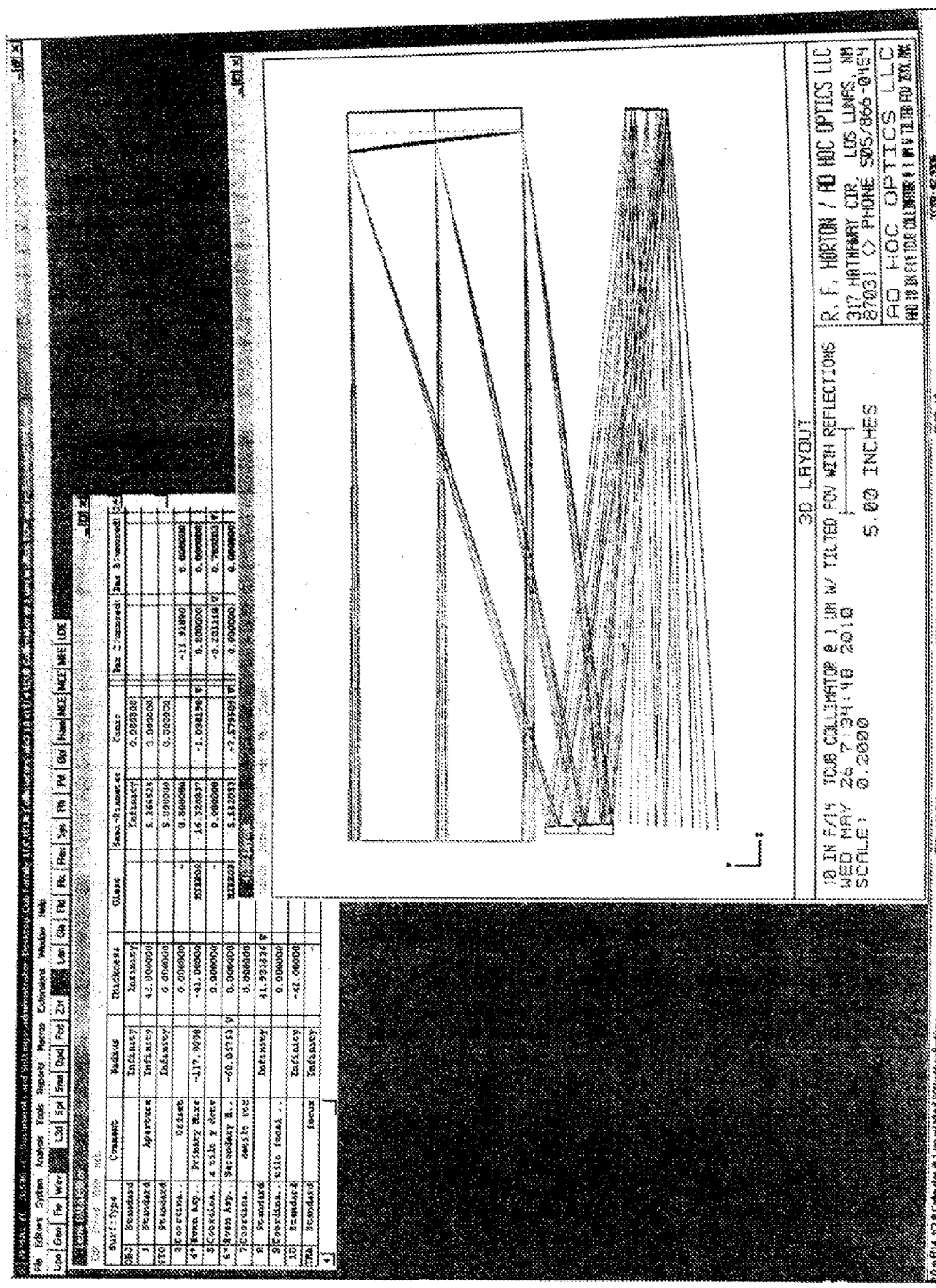
FIG. 47 is ZEMAX screen dump—f/14 tCUB stray light control
Figure 48:
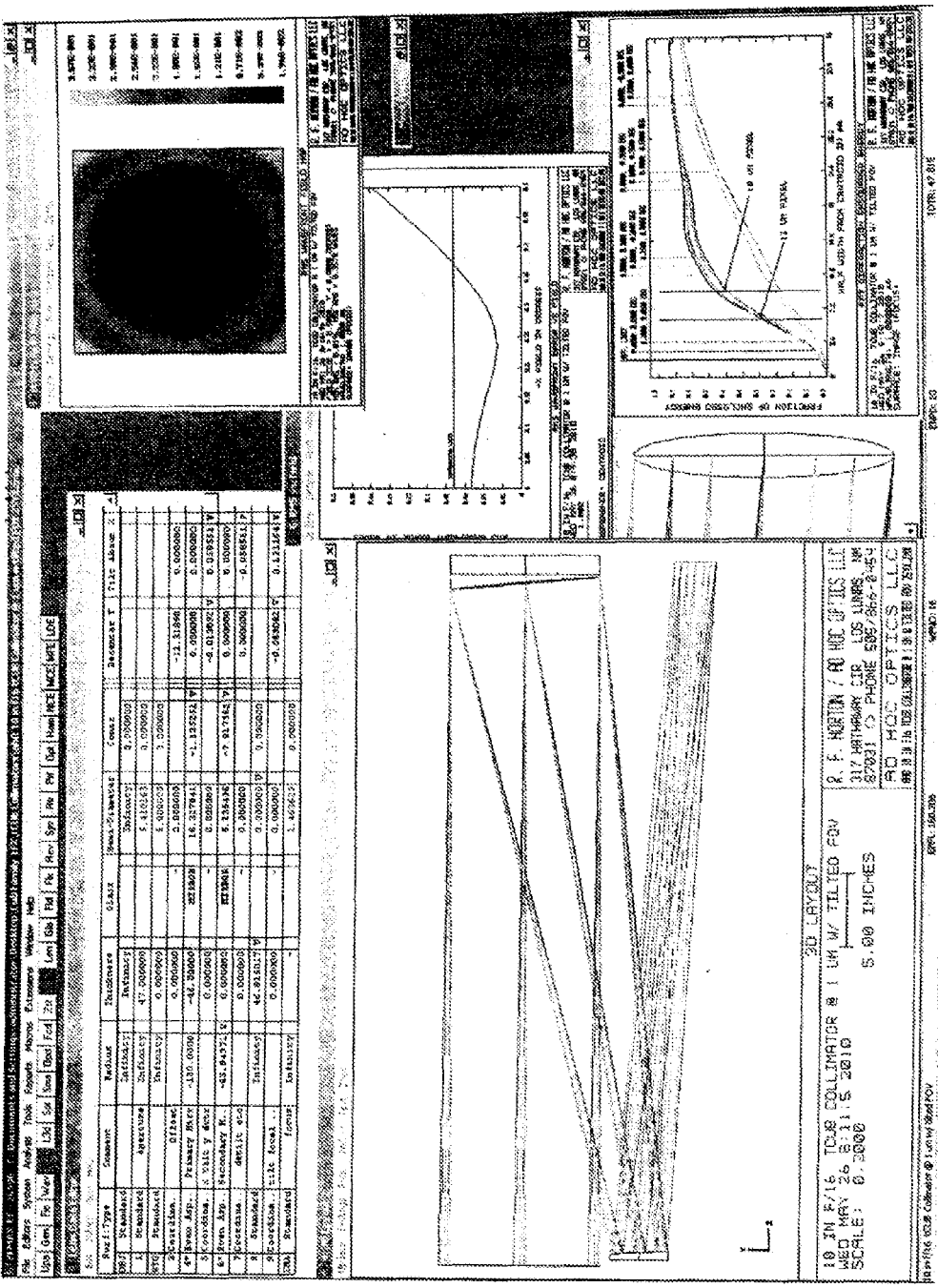
FIG. 48 is ZEMAX screen dump—f/16 tCUB optics and properties
Figure 49:
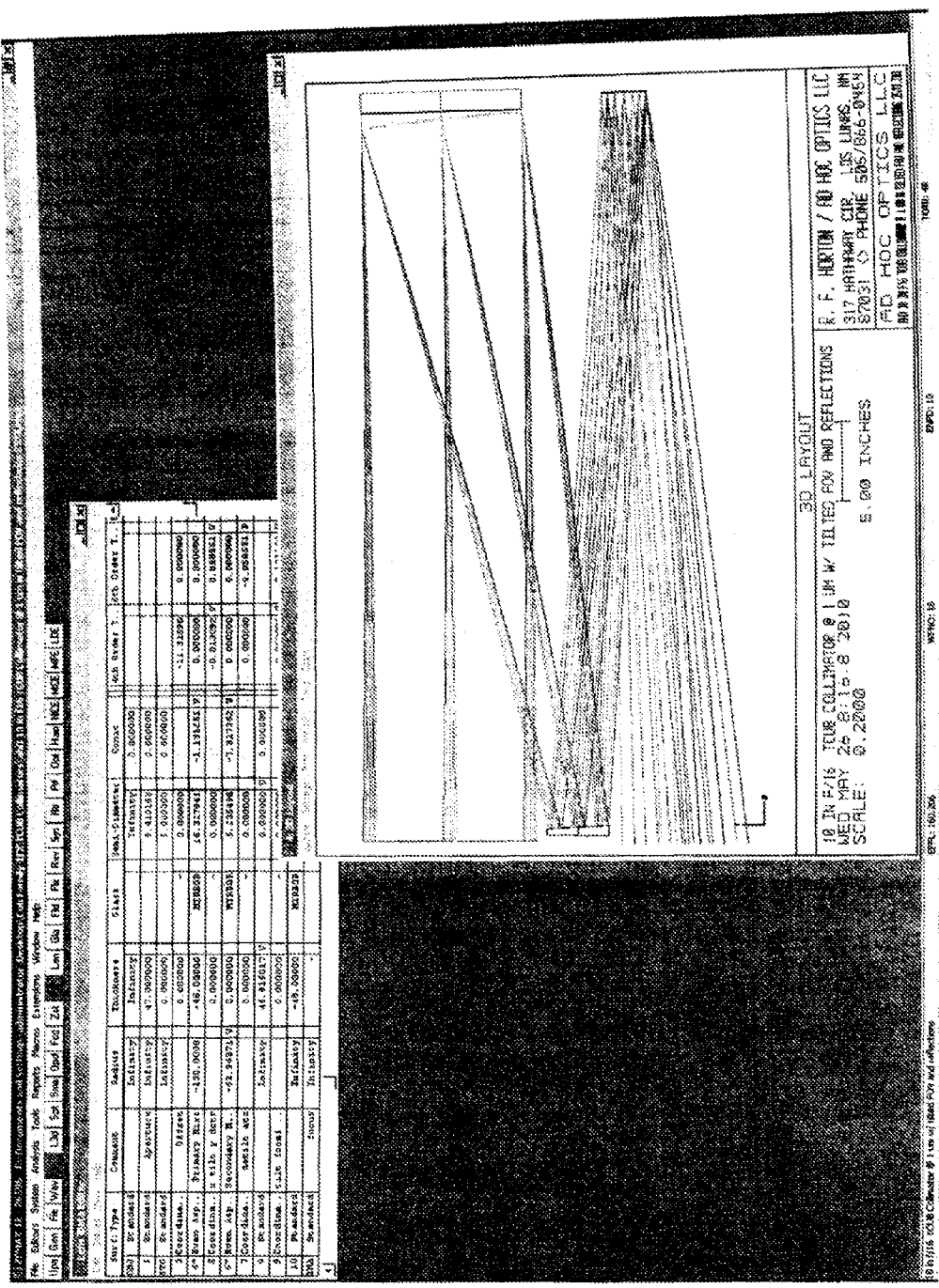
FIG. 49 is ZEMAX screen dump—f/16 tCUB stray light control

For systems which have been optimized for a focal surface tilted to the axis of the gut ray, for collimator use, disclosed is a family of tCUB optical systems, also from f/5 to f/16. These systems are described optical prescription parameters from ZEMAX which are shown in FIGS. 14-15. FIG. 14 shows spreadsheet compilations and plots of mirror radii and spacings. FIG. 15 shows spreadsheet compilations and plots of conic constants, decenters and tilts.

FIGS. 30 through 49 are printouts of ZEMAX screen dumps for tCUB optical systems from f/5 through f/16. The first of each two printout pages for each f/number are similar to the printouts for the nCUB, prior, and give a complete description of the optical device in terms of surfaces, surface vertex radius, thicknesses between surfaces, conic constants of the surfaces, tilts and decenters. The second page for each f/number shows how stray light from the test optic 80 is eliminated after reflection from a retical 72 at the tilted focal plane 08 surface and absorbed by a stop 74.

EXAMPLE III nUBA Telescopes

Figure 50:
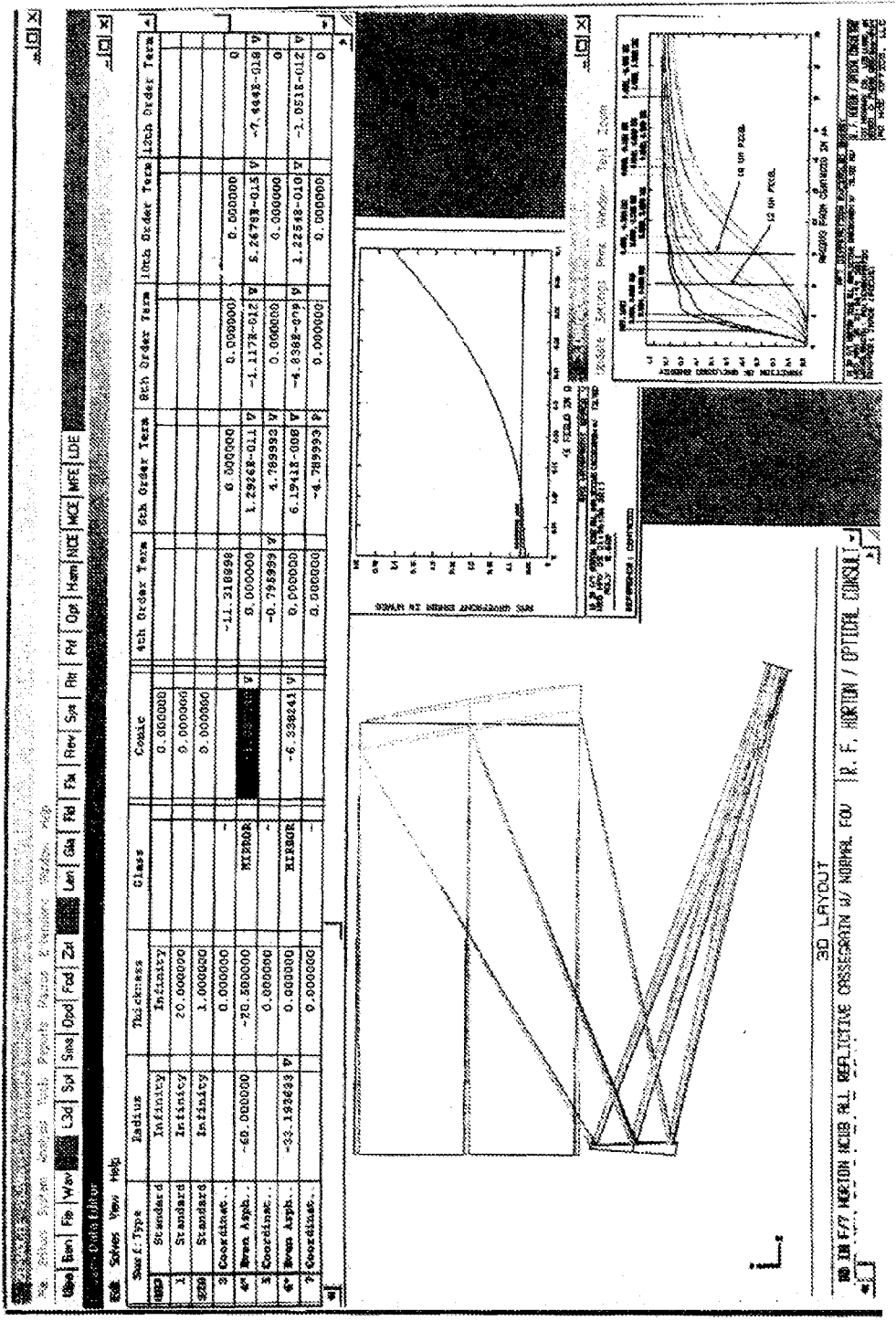
FIG. 50 is ZEMAX screen dump—f/7 tUBA optics and properties

The nUBA systems are analogs of the nCUB systems, except that they have $16^{th}$ order aspheric (A) primary and secondary mirror surface descriptions in place of the conic (C) formula for hyperbolas which are used for the CUB systems. Since the conic mathematical description is nominally equivalent to a $4^{th}$ order aspheric, the higher order aspheric terms allow a slightly better optical system at the expense of increased complexity and cost. FIG. 50 is a ZEMAX screen dump for an 10" f/7 example of a nUBA. Note that the performance is only slightly better than that of the nCUB.

EXAMPLE IV tUBA Systems

As with the nUBA systems, the tUBA systems are analogs of the tCUB systems, except that they have $16^{th}$ order aspheric (A) primary and secondary mirror surface descriptions in place of the conic (C) formula for hyperbolas which are used for the CUB systems.

EXAMPLE V

Torroidal Systems

As with the nCUB, tCUB systems and the nUBA and TUBA systems, there are analogs these systems, which would use generic aspheric torroidal surfaces. These analogs will have similar properties to the systems described earlier. As in the shift to higher order aspheric surfaces, this would add some performance at the cost of complexity and testing.

CONCLUSION

Tilting and decentering the secondary of the off axis two mirror system allows control of the tilt and position of the focal surface. By optimizing the tilt and decenter of the secondary in addition to other optical variables, one can control the tilt of the focal surface relative to the gut ray in these two mirror—off axis Cassegrain—Schiefspiegler geometry telescopes, while at the same time optimizing the image over a reasonably wide FOV. Being an all mirror system, there is no color aberrations, and the aberrations in general scale with aperture for a given f/number system.

Although the claimed invention has been described in detail with particular reference to these preferred embodiments, other embodiments can achieve the same results. Variations and modifications of the presently claimed invention will be obvious to those skilled in the art and it is intended to cover all such modifications and equivalents. The entire disclosures of all references, applications, patents, and publications cited above, are hereby incorporated by reference.

What is claimed is:
1. Two-mirror unobscured telescope systems comprising:
 (a) a family of designs ranging from f/5 to f/16 whose optical design parameters vary over the range, of which individual f/no optical design optimizations are given for f/5, f/6t f/7, f/8, f/9, f/10, f/10.7, f/12, f/14, and f/16;
 (b) a two mirror telescope, characterized by a symmetric geometry which includes two mirrors, two baffles, an unobscured entrance pupil and a focal plane;
 (c) a plane of symmetry, defined by the axis of symmetry of a primary mirror, an axis of symmetry of a secondary mirror and a gut ray of the system;
 (d) a design geometry, optimized by tilts, decenters, aspheric surface geometries of the primary and secondary mirrors, and separations and angles of these mirrors and focal surface, such that it simultaneously has a controlled focal plane tilt with respect to the gut ray, a nominally wide flat usable field of view, suitable baffling for stray light rejection, and focusing range along the gut ray for non Infinite conjugate imaging for each design;
 (e) the design geometry, further including a unique primary mirror surface, with a nominally aspheric concave surface figure, and center offset from a vertex axis of the parent primary mirror, configured to converge light toward a focus on a primary vertex axis for each design;

(f) the unobscured entrance pupil displaced laterally from said primary mirror vertex axis and located prior to the primary mirror, the spacings being unique to each design;

(g) the design geometry that uses a unique secondary mirror surface, with a nominally aspheric convex surface figure, and center offset from the vertex axis of the parent secondary mirror, additionally offset in distances longitudinally from the primary mirror vertex, laterally from the primary mirror vertex axis and tilted with respect to the primary mirror vertex axis, and configured to converge light toward a focus for each design;

(h) a geometry of a focal surface for flat extended field images, with the center offset in distances longitudinally from the secondary mirror vertex, and laterally from the secondary mirror vertex axis and a normal to the focal surface is tilted with respect to the secondary mirror vertex axis for each design;

(i) a tilt of the focal plane with respect to the direction of the gut ray defined by choice and optimized by the tilts, decenters, aspheric surface geometries of the primary and secondary mirrors, and separations and angles of these mirrors and focal surface for each design:

(j) the geometry of the focal surface, nominally at a given position for an infinite conjugate, and optimized so that the path of the center of the focal plane can be follows the gut ray as the non-infinite conjugate distance is varied for each design;

(k) a position for each of a pair of baffles to shield the focal plane from stray light entering through the entrance pupil, which allows usage of the design for a camera or visual observation for each design;

(l) a first baffle which is nominally situated between the entrance pupil and the secondary mirror, and is a plate perpendicular to and centered on the plane of symmetry, which is situated between the bundle of rays from the entrance pupil and the primary mirror and the bundle of rays from the primary mirror to the secondary mirror, for each design;

(m) a second baffle, which is nominally situated between the primary mirror and the focal plane, and is a plate perpendicular to and centered on the plane of symmetry, which is situated between the bundle of rays from the primary, and the secondary mirror and the bundle of rays from the secondary mirror to the focal plane, for each design, and, (n) geometry of the two baffles, optimized by the tilts, decenters, aspheric surface geometries of the primary and secondary mirrors, and separations and angles of these mirrors and focal surface, such that these baffles do not obscure any light from the entrance pupil to the focal plane, but are situated such that working together, no light can go from the entrance pupil to the focal surface, either at the infinite conjugate position or at finite conjugates, for each design.

2. The two mirror unobscured telescope systems of claim 1 further comprising an adjustable iris positioned at the entrance pupil and centered about a gut ray.

3. The two mirror un-obscured telescope systems of claim 1 wherein the geometry of each design can also be optimized by the tilts decanters, aspheric surface geometries of these primary and secondary mirrors, and separations and angles of these mirrors and focal surface, such that the focal surface is exactly normal to the gut ray for both infinite and non-infinite conjugates.

4. The two mirror unobscured telescope systems of claim 1 wherein said surfaces, offsets, distances and surface vertex radii are scaled with the entrance pupil diameter to provide an optimized system of a nominal f/number with a predetermined diameter.

5. The two mirror unobscured telescope systems of claim 1 wherein the tilt of the normal to the flat focal surface to a gut ray Is non-zero and at a predetermined angle.

6. The two mirror unobscured telescope systems of claim 5 configured such that the reflection from any detector or other optical element situated at the tilted focal plane is absorbed and not reflected back along the path entering the system.

7. The two mirror unobscured telescope systems of claim 6 further comprising a nominally reflecting reticle situated at the focal plane and a third baffle for absorbing any light reflected from a test optic by the partially reflecting reticle.

8. The two mirror unobscured telescope systems of claim 7 wherein the reticle has its target pattern as a transmitted image through the reticle, while the major surface of the reticle reflects the light from the test optic to an absorbing baffle, and not back in the direction of the test optic.

9. The two mirror unobscured telescope systems of claim 5 further comprising a reflecting mirror reticle with a reticle pattern, illuminated from behind by a high temperature source, and also illuminated on its front surface from an offset source so as to provide a diffuse uniform brightness background in addition to the high temperature-brightness reticle pattern.

10. The two mirror unobscured telescope systems of claim 1 further comprises accommodations for an eyepiece or camera system.

* * * * *